US012418965B2

(12) United States Patent
Casey

(10) Patent No.: US 12,418,965 B2
(45) Date of Patent: Sep. 16, 2025

(54) SYSTEM AND METHODS FOR GENERATING CUSTOMIZED COLOR TEMPERATURE DIMMING CURVES FOR LIGHTING DEVICES

(71) Applicant: Lutron Technology Company LLC, Coopersburg, PA (US)

(72) Inventor: Craig Alan Casey, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 278 days.

(21) Appl. No.: 18/120,247

(22) Filed: Mar. 10, 2023

(65) Prior Publication Data

US 2023/0319960 A1 Oct. 5, 2023

Related U.S. Application Data

(60) Provisional application No. 63/319,192, filed on Mar. 11, 2022.

(51) Int. Cl.
*H05B 45/20* (2020.01)

(52) U.S. Cl.
CPC .................................... *H05B 45/20* (2020.01)

(58) Field of Classification Search
CPC ........................... H05B 45/20; H05B 45/3574; H05B 45/3577; H05B 47/10; H05B 47/19; H05B 47/196; H05B 47/1965
See application file for complete search history.

(56) References Cited

U.S. PATENT DOCUMENTS

| | | | | |
|---|---|---|---|---|
| 1,737,183 | A * | 11/1929 | Brennan | B02C 7/14 241/259.3 |
| 10,076,011 | B1 * | 9/2018 | Amidi | H05B 47/183 |
| 10,420,185 | B2 | 9/2019 | Biery et al. | |
| 10,645,777 | B2 | 5/2020 | Casey et al. | |
| 11,202,354 | B2 | 12/2021 | Sooch et al. | |
| 11,375,591 | B2 | 6/2022 | Chaturvedi et al. | |
| 11,445,584 | B2 | 9/2022 | Barnes et al. | |
| 11,582,846 | B1 * | 2/2023 | Wang | H05B 47/195 |
| 11,612,029 | B2 | 3/2023 | Harte et al. | |
| 11,617,243 | B2 | 3/2023 | Bhutani et al. | |
| 11,737,183 | B2 | 8/2023 | Casey et al. | |
| 11,743,985 | B2 | 8/2023 | Green et al. | |
| 11,871,495 | B2 | 1/2024 | Ho et al. | |
| 2018/0177016 | A1 * | 6/2018 | Sooch | H05B 47/19 |

(Continued)

*Primary Examiner* — Thai Pham
(74) *Attorney, Agent, or Firm* — Flaster Greenberg P.C.

(57) ABSTRACT

One or more devices of a lighting control system may be configured to generate a custom CCT dimming curve for a lighting load. The device may receive, via a user selection, a high-end correlated color temperature (CCT) value, where the high-end CCT value is associated with a high-end intensity level of the lighting load. The device may receive, via a user selection, a CCT dimming curve from a plurality of selectable curve shapes. The device may determine a bend value and a CCT range based on the selected curve shape. The device may determine a low-end CCT value based on the high-end CCT value and the CCT range, where the low-end CCT value is associated with a low-end intensity level of the lighting load. The device may determine the custom CCT dimming curve based on the high-end CCT value, the low-end CCT value, and the bend value.

19 Claims, 16 Drawing Sheets

(56) References Cited

U.S. PATENT DOCUMENTS

| | | | | |
|---|---|---|---|---|
| 2020/0314974 | A1* | 10/2020 | Thurk ................ | H05B 45/3577 |
| 2021/0357111 | A1 | 11/2021 | Alfonzo et al. | |
| 2022/0341256 | A1 | 10/2022 | Casey et al. | |
| 2022/0342373 | A1 | 10/2022 | Ho et al. | |
| 2024/0155751 | A1 | 5/2024 | Baker et al. | |

* cited by examiner

SYSTEM AND METHODS FOR GENERATING CUSTOMIZED COLOR TEMPERATURE DIMMING CURVES FOR LIGHTING DEVICES

CROSS-REFERENCE TO RELATED APPLICATIONS

This application claims the benefit of Provisional U.S. Pat. Application No. 63/319,192, filed Mar. 11, 2022, the disclosure of which is incorporated herein by reference in its entirety.

BACKGROUND

A user environment, such as a residence or an office building for example, may be configured using various types of load control systems. A lighting control system may be used to control the lighting loads in the user environment. Each load control system may include various control devices, including input devices and load control devices. The load control devices may receive digital messages, which may include load control instructions, for controlling an electrical load from one or more of the load control devices. The load control devices may be capable of directly controlling an electrical load. The input devices may be capable of indirectly controlling the electrical load via the load control device. Examples of load control devices may include lighting control devices (e.g., a dimmer, a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, temperature sensors, and/or the like.

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

SUMMARY

As described herein, a lighting control system (e.g., any combination of a system controller, a computing device, a dimmer, a lighting control device, and/or a lighting device) may create a custom correlated color temperature (CCT) dimming curve for a lighting load. The lighting control system may receive, via a user selection (e.g., via a display device), a high-end CCT value, where the high-end CCT value is associated with a high-end intensity level of the lighting load. The lighting control system may receive, via a user selection, a dimming curve from a plurality of selectable dimming curves. The lighting control system may determine a bend value and a CCT range based on the selected dimming curve. The lighting control system may determine a low-end CCT value based on the high-end CCT value and the CCT range, where the low-end CCT value is associated with a low-end intensity level of the lighting load. The lighting control system may determine (e.g., generate) the custom dimming curve based on the high-end CCT value, the low-end CCT value, and the bend value. In some examples, lighting control system may transmit the custom dimming curve to the lighting load or a control device for the lighting load.

The bend value may define an amount of curvature in the line defining the CCT values across a dimming range between the high-end CCT value and the low-end CCT value. In some examples, the bend value may be a decimal value between 0-1.0. In some examples, the plurality of selectable dimming curves may comprise a warm dimming curve, a daylight dimming curve, and a cool dimming curve. In some examples, each dimming curve may be defined by a CCT range and a bend value.

A lighting control system (e.g., any combination of a system controller, a computing device, a dimmer, a lighting control device, and/or a lighting device) may create a custom correlated color temperature (CCT) dimming curve for a lighting load. The lighting control system may receive, via a user selection, a high-end correlated color temperature (CCT) value, where the high-end CCT value is associated with a high-end intensity level of the lighting load. The lighting control system may receive, via a user selection, a low-end CCT value, where the low-end CCT value is associated with a low-end intensity level of the lighting load. The lighting control system may receive, via a user selection, an intermediate CCT value, where the intermediate CCT value is associated with an intermediate intensity level of the lighting load, and wherein the intermediate intensity level resides between the high-end intensity level and the low-end intensity level. The lighting control system may determine a bend value based on the high-end CCT value, the low-end CCT value, and the intermediate CCT value. The lighting control system may determine (e.g., generate) the custom dimming curve based on the high-end CCT value, the low-end CCT value, and the bend value. In some examples, the lighting control system may transmit the custom dimming curve to the lighting load or a control device for the lighting load.

In some examples, the lighting control system may determine the bend value based on the high-end CCT value, the high-end intensity level, the low-end CCT value, the low-end intensity level, the intermediate CCT value, and the intermediate intensity level. In some examples, the lighting control system may receive, via a user selection, the intermediate intensity level for the intermediate CCT range. In some examples, the selection of the intermediate intensity level may be restricted to a predefined intensity range.

The bend value may define an amount of curvature in the line defining the CCT values across a dimming range between the high-end CCT value and the low-end CCT value. In some examples, the bend value may be a decimal value between 0-1.0.

A lighting control system (e.g., any combination of a system controller, a computing device, a dimmer, a lighting control device, and/or a lighting device) may create a custom correlated color temperature (CCT) dimming curve for a lighting load. The lighting control system may receive, via a user selection (e.g., via a graphical user interface (GUI) presented on a display of a mobile device), a high-end correlated color temperature (CCT) value, where the high-end CCT value is associated with a high-end intensity level of the lighting load. The lighting control system may receive, via a user selection (e.g., via a GUI presented on a display of a mobile device), a dimming curve from a plurality of selectable dimming curves. The lighting control system may determine a bend value and a CCT range based on the selected dimming curve. The lighting control system may determine (e.g., calculate) a CCT value for each of a plurality of different intensity levels using the CCT range and the bend value to create the custom dimming curve. The lighting control system may transmit the custom dimming curve to the lighting load or a control device configured to control the lighting load.

In some examples, the lighting control system may determine (e.g., calculate) a low-end CCT value based on the high-end CCT value and the CCT range, wherein the low-end CCT value is associated with a low-end intensity level of the lighting load.

In some examples, the lighting control system may determine the CCT value for each of the plurality of different intensity levels across a dimming range than spans from the low-end intensity level to the high-end intensity level. The dimming range may be defined by 256 dimming levels.

In some examples, the lighting control system may determine the CCT value for each of the plurality of different intensity levels across the dimming range is performed based on an equation, such as $$CCT[d] = \frac{(CCT_{HE} - CCT_{LE}) \cdot (1 + B) \cdot d}{B + d} + CCT_{LE},$$

where CCT[d] is the CCT value for a particular dimming level, $CCT_{HE}$ is the high-end CCT value, $CCT_{LE}$ is the low-end CCT value, B is the bend value, and d is the dimming level.

The bend value may define an amount of curvature in the line defining the CCT values across a dimming range between the high-end CCT value and the low-end CCT value. In some examples, the bend value may be a decimal value between 0-1.0. In some examples, the plurality of selectable dimming curves may comprise a warm dimming curve, a daylight dimming curve, and a cool dimming curve. In some examples, each dimming curve may be defined by a CCT range and a bend value.

A lighting control system (e.g., any combination of a system controller, a computing device, a dimmer, a lighting control device, and/or a lighting device) may create a custom correlated color temperature (CCT) dimming curve for a lighting load. The lighting control system may receive, via a user selection, a high-end correlated color temperature (CCT) value, where the high-end CCT value is associated with a high-end intensity level of the lighting load. The lighting control system may receive, via a user selection, a dimming curve from a plurality of selectable dimming curves. The lighting control system may determine a bend value and a CCT range based on the selected dimming curve. The lighting control system may transmit custom dimming curve data to the lighting load. In some examples, the custom dimming curve data may include the high-end CCT value, the CCT range, and the bend value. In some examples, the lighting control system may determine a low-end CCT value based on the high-end CCT value and the CCT range, and the custom curve data may include the low-end CCT value, the CCT range, and the bend. In some examples, the lighting control system may determine a low-end CCT value based on the high-end CCT value and the CCT range, and the custom curve data may include the high-end CCT value, the low-end CCT value, and the bend.

The bend value may define an amount of curvature in the line defining the CCT values across a dimming range between the high-end CCT value and the low-end CCT value. In some examples, the bend value may be a decimal value between 0-1.0. In some examples, the plurality of selectable dimming curves may comprise a warm dimming curve, a daylight dimming curve, and a cool dimming curve. In some examples, each dimming curve may be defined by a CCT range and a bend value.

In some examples, the lighting control system (e.g., the lighting load or lighting control device) may receive the high-end CCT value, the CCT range, and the bend value at the lighting load, determine a low-end CCT value based on the CCT range and the high-end CCT value, and store the high-end CCT value, the low-end CCT value, and the bend value in memory. In such examples, the lighting control system (e.g., the lighting load or lighting control device) may control controlling the lighting load based on a present intensity level and a present CCT value, wherein the present CCT value is determined based on the high-end CCT, the low-end CCT, and the bend value. Further, the lighting control system (e.g., the lighting load or lighting control device) may receive a dimming level, retrieve the high-end CCT value, the low-end CCT value, and the bend value from the memory, determine a CCT value for the dimming level based on the high-end CCT value, the low-end CCT value, and the bend value, and control the lighting load according to the dimming level and the CCT value for the dimming level. For instance, the lighting control system may determine the CCT value for each of the plurality of different intensity levels across the dimming range is performed based on an equation, such as $$CCT[d] = \frac{(CCT_{HE} - CCT_{LE}) \cdot (1 + B) \cdot d}{B + d} + CCT_{LE},$$

where CCT[d] is the CCT value for a particular dimming level, $CCT_{HE}$ is the high-end CCT value, $CCT_{LE}$ is the low-end CCT value, B is the bend value, and d is the dimming level.

Further, in some instances, the lighting control system (e.g., the lighting load or lighting control device) may receive an updated high-end CCT value, calculate an updated low-end CCT value based on the updated high-end CCT value and the CCT range, and store the updated high-end CCT value and the updated low-end CCT value in the memory. The lighting control system (e.g., the lighting load or lighting control device) may determine an updated CCT value for the dimming level based on the updated high-end CCT value, the updated low-end CCT value, and the bend value, and control the lighting load according to the dimming level and the updated CCT value for the dimming level. In some examples, the updated high-end CCT value may be determined based on the time of day. Further, in some examples, the lighting load may be configured to operate according to a natural show control technique where CCT values across the dimming range change based on the time of day to mimic CCT values of the sun throughout the day.

DETAILED DESCRIPTION

Figure 1:
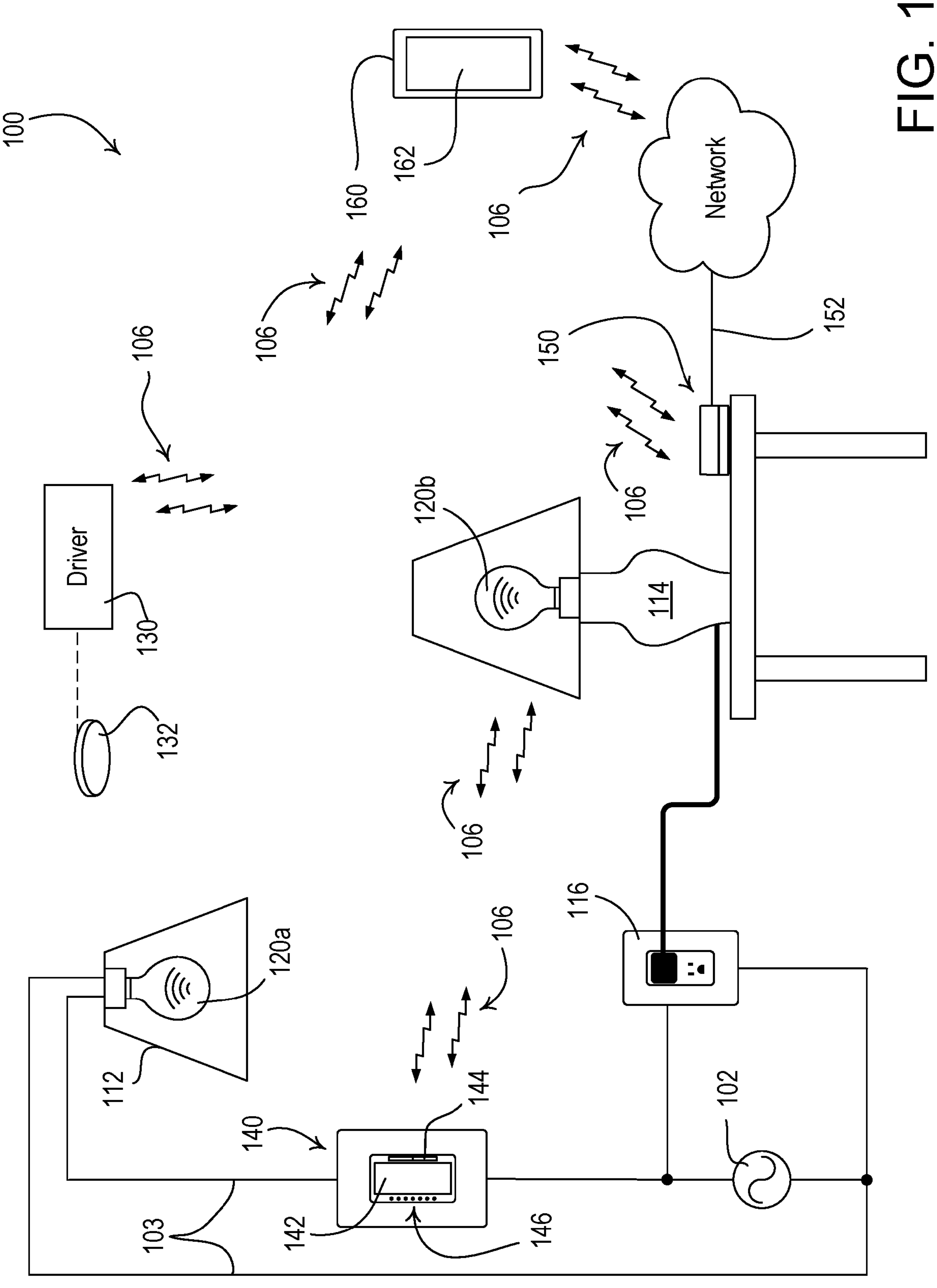
FIG. 1 depicts an example load control system that include one or more control devices and one or more smart lighting devices.

FIG. 1 is a simplified block diagrams of example load control system (e.g., a lighting control system). FIG. 1 depicts an example of a lighting control system having a plurality of lighting devices, such as at least one smart lighting device (e.g., smart bulbs 120*a*, 120*b*). As shown, the smart bulb 120*a* may be installed in a ceiling-mounted downlight fixture 112 and the smart bulb 120*b* may be installed in a tabletop lighting fixture 114, such as a lamp (e.g., table lamp). The smart bulbs 120*a*, 120*b* shown in FIG. 1 may include light sources of different types (e.g., incandescent lamps, fluorescent lamps, and/or light-emitting diode (LED) light sources).

The smart bulbs 120*a*, 120*b* may be capable of transmitting and/or receiving wireless communications. For example, the smart bulbs 120*a*, 120*b* may each include a wireless communication circuit (e.g., a radio frequency (RF) transceiver) operable to transmit and/or receive wireless signals such as RF signals 106 (e.g., using a wireless protocol, such as ZIGBEE, THREAD, NFC, BLUETOOTH, BLUETOOTH LOW ENERGY (BLE), WI-FI, CLEAR CONNECT, CLEAR CONNECT TYPE X protocols). The smart bulbs 120*a*, 120*b* may be configured to communicate according to one or more proprietary and/or standardized wireless communication standards. One or more of the smart bulbs 120*a*, 120*b* may have advanced features. For example, one or more of the smart bulbs 120*a*, 120*b* may be controlled to emit light of varying intensity levels and/or colors (e.g., color temperatures, such as correlated color temperatures (CCTs), and/or other colors) in response to control instructions received in messages (e.g., digital messages) from another control device.

The smart bulb 120*a* may be configured to determine whether to respond to phase-control or digital control messages (e.g., from a dimmer 140). For example, the smart bulb 120*a* may determine that the dimmer 140 is generating a phase-control signal (e.g., phase-control signals). Alternatively or in addition, the smart bulb 120*a* may receive a configuration message from the dimmer 140. In response to receiving the configuration message, the smart bulb 120*a* may determine to control an amount of power delivered to its light source in accordance with control messages (e.g., wireless control messages) received from the dimmer 140. In some examples, the smart bulb 120*a* may be programmable via the RF signal 160 (e.g., to receive CCT-dimming curve data), and thereafter, the smart bulb 120*a* may respond to a phase-controlled AC signal from the dimmer 140, such as receiving a target intensity level $L_{TRGT}$ and determining a CCT value according to the CCT-dimming curve data.

The lighting control system 100 may include one or more additional lighting devices, such as a light-emitting diode (LED) driver 130 for driving an LED light source 132 (e.g., an LED light engine). The LED driver 130 may be located in or adjacent to the lighting fixture of the LED light source 132. The LED driver 130 may be configured to receive digital messages via the RF signals 106 (e.g., from a system controller 150, a computing device 160, and/or the dimmer 140) and to control the LED light source 132 in response to the received digital messages. The LED driver 130 may be configured to communicate according to one or more proprietary and/or standardized wireless communication standards. The LED driver 130 may be configured to adjust the color temperature of the LED light source 132 in response to the received digital messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. The lighting control system 100 may further comprise other types of load control devices, such as, for example, electronic dimming ballasts for driving fluorescent lamps.

The lighting devices (e.g., the smart bulbs 120*a*, 120*b*, and/or the LED driver 130) may be configured to control the color temperature, e.g., correlated color temperature (CCT), of the cumulative light emitted by the lighting device to be equal to a target color temperature $T_{TRGT}$. The lighting device (e.g., a control circuit of the lighting device) may determine how to mix (e.g., the mix may include a lumen value for each emitter circuit) the light emitted by a plurality (e.g., two) emitter circuits (e.g., LEDs) of the lighting device to cause the CCT of the cumulative light emitted by the lighting device to be equal to the target color temperature $T_{TRGT}$. For example, the lighting device may be configured to weigh the amount of power delivered each emitter circuit to generate the target color temperature $T_{TRGT}$ to, for example, weigh the mixing of the color temperatures of each emitter and cause the T of the cumulative light emitted by the lighting device to be equal to the target color temperature $T_{TRGT}$. For instance, the lighting device may control the magnitudes of respective drive currents conducted through the emitter circuits to specific magnitudes based on, for example, the target color temperature $T_{TRGT}$, the target intensity level $L_{TRGT}$, and/or the specific CCT of each emitter circuit. For example, the lighting device may determine the magnitude of the drive currents based on the lumen values needed from each emitter circuit to generate the target color temperature $T_{TRGT}$. The lighting device may use a table (e.g., stored in memory) and/or one or more equations to determine the lumen values and/or the magnitude of the drive currents necessary to cause the CCT of the cumulative light emitted by the lighting device to be equal to the target color temperature $T_{TRGT}$. Alternatively, the system may send, to the lighting device, the lumen values and/or the magnitude of the drive currents necessary to cause the CCT of the cumulative light emitted by the lighting device to be equal to the target color temperature $T_{TRGT}$.

The lighting control system 100 may comprise a load control device, such as a dimmer 140, that is electrically coupled in series between an alternating-current (AC) power source 102 and the smart bulb 120*a*, such that the smart bulb 120*a* may receive power from the AC power source 102 via the dimmer 140. Alternatively, in some examples, the dimmer 140 may operate as a remote control device and may not be coupled in series between an alternating-current (AC) power source 102 and the smart bulb 120*a*. Rather, when configured as a remote control device, the dimmer 140 may be installed overtop of an existing switch that is coupled in series between an alternating-current (AC) power source 102 and the smart bulb 120*a*, may be installed on a tabletop stand or the wall, or may be otherwise configured within the lighting control system. The tabletop lighting fixture 114 may be plugged into an electrical receptacle 116 that is electrically coupled to the AC power source 102, such that the smart bulb 120*b* may receive power from the AC power source 102. Though the smart bulbs 120*a*, 120*b* are shown in FIG. 1, any number of non-smart and smart bulbs may be supported in the lighting control system 100.

The dimmer 140 may be configured to transmit messages via the RF signals 106 for controlling the smart bulbs 120*a*, 120*b* and/or the LED driver 130. The dimmer 140 may include a wireless communication circuit that is configured to transmit and/or receive wireless signals such as RF signals 106. For example, the dimmer 140 may be configured to transmit messages to load control devices (e.g., the smart bulbs 120*a*, 120*b* and/or the LED driver 130) that are within a wireless communication range of the dimmer 140 via the RF signals 106. The dimmer 140 may be configured to communicate according to one or more proprietary and/or standardized wireless communication standards.

The lighting control system 100 may include one or more control devices for controlling the non-smart and smart bulbs 120*a*, 120*b* (e.g., controlling an amount of power delivered to the light sources of the bulbs). The smart bulbs 120*a*, 120*b* may be controlled substantially in unison, or be controlled individually. For example, the bulbs may be zoned so that the smart bulb 120*a* may be controlled by a first control device, while the smart bulb 120*b* may be controlled by a second control device. The control devices may be configured to turn the smart bulbs 120*a*, 120*b* on and off. The control devices may be configured to control an intensity level of each of the smart bulbs 120*a*, 120*b* between a low-end intensity level $L_{LE}$ and a high-end intensity level $L_{HE}$, for example. The control devices may be configured to control a color (e.g., a color temperature, or CCT value) of light emitted by the smart bulbs 120*a*, 120*b*.

The dimmer 140 may be configured as a wall-mounted load control device (e.g., as shown in FIG. 1). The dimmer 140 may be a smart load control device or a non-smart load control device. The dimmer 140 may be configured to be mounted to a standard electrical wall box (e.g., via a yoke) and be coupled in series electrical connection between the AC power source 102 and the smart bulb 120*a*. The dimmer 140 may receive an AC mains line voltage from the AC power source 102, and may generate a phase-control signal for controlling the smart bulb 120*a*. The phase-control signal may be a phase-cut AC waveform. Examples of wall-mounted dimmers are described in greater detail in commonly-assigned U.S. Pat. No. 8,664,881, issued Mar. 4, 2014, entitled TWO-WIRE DIMMER SWITCH FOR LOW-POWER LOADS, the entire disclosure of which is hereby incorporated by reference. Alternatively, as noted above, the dimmer 140 may operate as a remote control device that is not coupled in series between an alternating-current (AC) power source 102 and the smart bulb 120*a*, but is otherwise installed within the lighting control system 100 (e.g., that is installed on top of an existing light switch, installed on the wall, configured with a tabletop stand, etc.).

The dimmer 140 may be configured to be responsive to a user input and generate control instructions (e.g., a wired and/or wireless control signal) for controlling the smart bulb 120*a* and/or 120*b* based on the user input. The dimmer 140 may include a toggle actuator 142, a level-adjustment actuator 144, and/or a plurality of visible indicators 146. The dimmer 140 may turn the smart bulbs 120*a*, 120*b* on and off in response to actuations of the toggle actuator 142, and/or adjust the intensity level of the smart bulbs 120*a*, 120*b* in response to actuations of the level-adjustment actuator 144. In some examples, the dimmer 140 may adjust a phase-angle of the phase-control signal to adjust the intensity level of the smart bulbs 120*a* in response to actuation of the level-adjustment actuator 144. The dimmer 140 may generate the phase-control signal via various phase-control techniques (e.g., a forward phase-control dimming technique, a reverse phase-control dimming technique, a center phase-control technique, a notch phase-control technique, and/or a multi-phase-control technique). The plurality of lighting indicators 146 may include one or more internal light sources (e.g., LEDs) configured to be illuminated to provide feedback to a user of the smart dimmer 140. Such feedback may indicate, for example, a status of the smart bulbs 120*a*, 120*b*, such as whether the light sources of the smart bulbs 120*a*, 120*b* are on or off, a present intensity level of the smart bulbs 120*a*, 120*b*, and so on. The feedback may indicate a status of the dimmer 140 itself such as a power status of the dimmer 140.

A user may install a smart lighting device (e.g., such as the smart bulb 120*a*) on a circuit 103 that is controlled by the dimmer 140. As such, the smart lighting device (e.g., the smart bulb 120*a*) may include one or more features that are not available when controlled by a load control device. For example, advanced features, such as full-range dimming, adjustable dimming control (e.g., use of multiple and/or adjustable dimming control curves), color control, and/or other advanced features, may not be available when the smart lighting device (e.g., the smart bulb 120*a*) is controlled by a load control device. The intensity level of the smart lighting device (e.g., smart bulb 120*a*) may be similarly controlled by the phase-control signal received from the dimmer 140.

The lighting control system 100 may also include a system controller 150 and/or a computing device 160 (e.g., a mobile device, such as a smart phone or a tablet). The system controller 150 may be configured to transmit and/or receive communication signals (e.g., the RF signals 106). The system controller 150 may be configured to transmit messages (e.g., digital messages) to the smart bulbs 120*a*, 120*b* for controlling the smart bulbs 120*a*, 120*b*, and/or transmit messages to the LED driver 130 for controlling the LED light source 132. The system controller 150 may communicate via one or more types of RF communication signals, such as RF signals 106 (e.g., using a wireless protocol, such as ZIGBEE, THREAD, NFC, BLUETOOTH, BLUETOOTH LOW ENERGY (BLE), WI-FI, CLEAR CONNECT, CLEAR CONNECT TYPE X protocols). The system controller 150 may be configured to communicate according to one or more proprietary and/or standardized wireless communication standards.

The system controller 150 may be connected to a network 152, e.g., via a wired or wireless communication link. The system controller 150 may be configured to communicate messages with the computing device 160 (e.g., a mobile device, such as a smart phone or a tablet) via RF signals 106 transmitting through the network 152. The system controller 150 may be configured to receive messages including commands for controlling the smart bulbs 120*a*, 120*b* from the computing device 160 via the network 152 and/or transmit messages via the network 152 for providing data (e.g., status information) to the computing device 160 and/or other external devices.

The computing device 160 may be configured to transmit and/or receive communication signals (e.g., the RF signals 106). The computing device 160 may be configured to transmit messages (e.g., digital messages) to the smart bulbs 120*a*, 120*b* for controlling the smart bulbs 120*a*, 120*b*, and/or transmit messages to the LED driver 130 for controlling the LED light source 132. The computing device 160 may communicate via one or more types of RF communication signals, such as RF signals 106 (e.g., using a wireless protocol, such as ZIGBEE, THREAD, NFC, BLUETOOTH, BLUETOOTH LOW ENERGY (BLE), WI-FI, CLEAR CONNECT, CLEAR CONNECT TYPE X protocols). The computing device 160 may be configured to communicate according to one or more proprietary and/or standardized wireless communication standards.

The computing device 160 may be located on an occupant, for example, may be attached to the occupant's body or clothing or may be held by the occupant. The computing device 160 may be characterized by a unique identifier (e.g., a serial number or address stored in memory) that uniquely identifies the computing device 160. Examples of personal computing devices may include a smart phone, a laptop, and/or a tablet device. Examples of wearable wireless devices may include an activity tracking device, a smart watch, smart clothing, and/or smart glasses. In addition, the system controller 150 may be configured to communicate via the network with one or more other control systems (e.g., a building management system, a security system, etc.).

The computing device 160 may be configured to transmit messages to the system controller 150, for example, in one or more Internet Protocol packets. For example, the computing device 160 may be configured to transmit messages to the system controller 150 over the LAN and/or via the Internet. The computing device 160 may be configured to transmit messages over the Internet to an external service, and then the messages may be received by the system controller 150.

The lighting control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the lighting control system 100 (e.g., one or more customized dimming curves and/or customized CCT-dimming curves) may be programmed and configured using, for example, the computing device 160. The computing device 160 may execute a graphical user interface (GUI) configuration software for allowing a user to program how the lighting control system 100 will operate. For example, the configuration software may run as a PC application, a web interface, and/or an application interface. The configuration software may be executed locally at the computing device 160 and/or on the system controller 150. For example, the configuration software may be executed as a local application on the computing device 160 that communicates with the system controller 150, load control devices, and/or lighting control devices to operate as described herein. In another example, the configuration software may execute on the system controller 150 and may be displayed on the computing device 160 via a local application (e.g., a browser) for displaying the GUI.

The configuration software and/or the system controller 150 (e.g., via instructions from the configuration software) may generate the system configuration data that may include a load control dataset that defines the operation of the lighting control system 100 (e.g., one or more customized dimming curves and/or customized CCT-dimming curves). For example, the load control dataset may include information regarding the operational settings of different load control devices of the lighting control system 100 (e.g., the smart bulbs 120*a*, 120*b*, the LED driver 130 for driving the LED light source 132, etc.). The load control dataset may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS.

Figure 2:
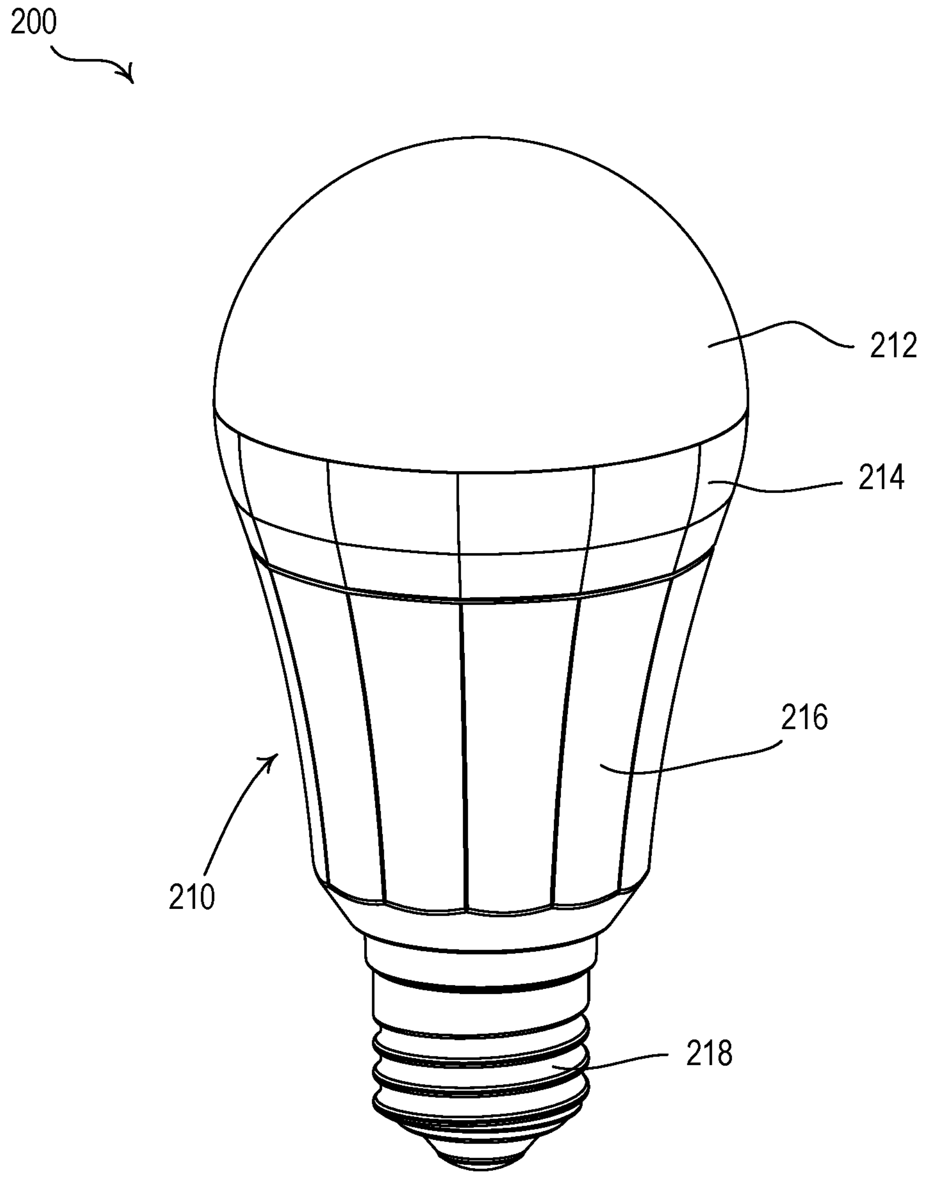
FIG. 2 is a simplified block diagram of an example smart lighting device that may be deployed in the lighting control system illustrated in FIG. 1.

FIG. 2 is a perspective view of an example illumination device, such as a lighting device 200 (e.g., a controllable LED lighting device). The lighting device 200 may be an example of a smart light bulb, such as the smart bulb 120*a*, 120*b* of the lighting control system 100 of FIG. 1. The lighting device 200 may include a housing 210 having an upper dome 212 (e.g., a lens), a lower dome 214, and a housing heat sink 216. The upper dome 212 may be transparent or translucent and may be flat or domed, for example. For example, the lamp may comprise an A-type lamp. In some examples, the lighting device 200 may comprise an integral lighting load (e.g., one or more LEDs) that are configured to emit light that is configured to shine through the upper dome 212. The lighting device 200 may be installed in a lighting fixture (e.g., such as a downlight fixture and/or a table or floor lamp), and may be replaceable and/or removeable. The lighting device 200 may also have the form factor of other replaceable and/or removeable lamp, such as a parabolic aluminized reflector (PAR) lamp.

The lighting device 200 may include a base 218 (e.g., a screw-in base) that may be configured to be connected to (e.g., screwed into) a socket (e.g., a standard Edison socket) for electrically coupling the lighting device 200 to a power source, e.g., an alternating-current (AC) power source. The lighting device 200 may also have another type of base, such as a pin base, a twist-and-lock base, a bayonet base, or other suitable type of base. The lighting device 200 may have a different form factor, such as a linear form factor or other shape and/or size. The lighting device 200 may also be installed (e.g., permanently installed) in a lighting fixture, such as a downlight fixture, a linear lighting fixture, a strip lighting fixture, or other lighting fixture having one or more integral lighting devices (e.g., light engines).

Figure 3:
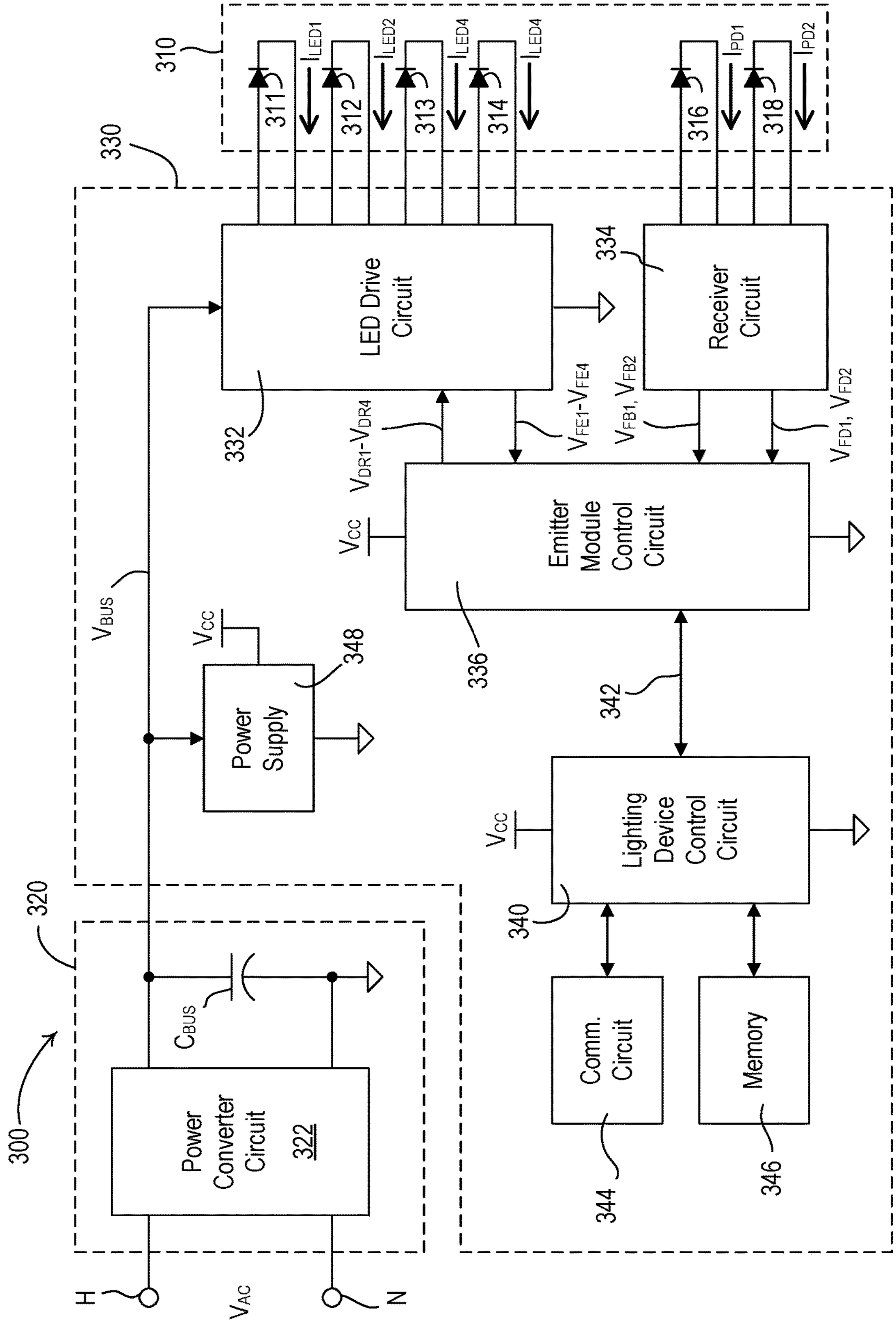
FIG. 3 is a simplified block diagram of an example controllable lighting device that may be deployed in the lighting control system illustrated in FIG. 1.

FIG. 3 is a simplified block diagram of an example controllable lighting device 300 for use in a lighting control system (e.g., the lighting control system 100 of FIG. 1). The controllable lighting device may be an example of a smart bulb, such as the smart bulbs 120*a*, 120*b* shown in FIG. 1, a smart lighting device, such as the LED driver 130 of FIG. 1, and/or the like. As described in more detail below, the controllable lighting device 300 may include all or a subset of the components illustrated in FIG. 3.

The controllable lighting device 300 may comprise a light source 310. For example, the light source 310 of the controllable lighting device 300 may comprise one or more emitter circuits 311, 312, 313, 314 (e.g., LEDs). Each of the emitter circuits 311, 312, 313, 314 may include one or more emitters. The emitters of each emitter circuit 311, 312, 313, 314 may be electrically coupled together in a series or parallel connection. As such, the emitters of each emitter circuits 311, 312, 313, 314 may be controlled in unison. The emitter circuits 311, 312, 313, 314 may be controlled to adjust an intensity level (e.g., lighting intensity level and/or brightness) and/or a color (e.g., color temperature) of a cumulative light output of the controllable lighting device 300.

Each of the emitter circuits 311, 312, 313, 314 is shown in FIG. 3 as a single LED, but may each comprise a plurality of LEDs connected in series (e.g., a string or chain of LEDs), a plurality of LEDs connected in parallel, or a suitable combination thereof, depending on the particular lighting system. The emitter circuits 311, 312, 313, 314 may comprise, for example, white phosphor-coated LEDs. The emitter circuits 311, 312, 313, 314 may each represent a string of one or more LEDs, where the LEDs in each string are all configured to emit light at the same color temperature. The strings of LEDs represented by each of the emitter circuits 311, 312, 313, 314 may be configured to emit light at different color temperatures. Further, the emitters of the light source 310 are not limited to LEDs, and in some examples, other technology, such as OLEDs.

Each of the emitter circuits 311, 312, 313, 314 may be configured to emit light at a color temperature (e.g., a different color temperature or CCT value) that is along the black body locus. The emitter circuits that are configured to emit light at high color temperatures may comprise more LEDs than the emitters at lower color temperatures. For example, the first emitter circuit 311 may represent a string of LEDs (e.g., eight LEDs) at a first color temperature, the second emitter circuit 312 may represent a string of LEDs (e.g., eight LEDs) at a second color temperature, the third emitter circuit 313 may represent a string of LEDs (e.g., five LEDs) at a third color temperature, and the fourth emitter circuit 314 may represent a chain of LEDs (e.g., one LED) at a fourth color temperature. The first color temperature may be greater than the second color temperature, the second color temperature may be greater than the third color temperature, and the third color temperature may be greater than the fourth color temperature.

As an example, the first color temperature may be between 5,900 K and 5,500 K, or more preferably between 5,800 K and 5,600 K, or most preferably between 5,750 K and 5,650 K. The second color temperature may be between 3,200 K and 2,800 K, or more preferably between 3,100 K and 2,900 K, or most preferably between 3,050 K and 2,950 K. The third color temperature may be between 2,400 K and 2,000 K, or more preferably between 2,300 K and 2,100 K, or most preferably between 2,250 K and 2,150 K. The fourth color temperature may be between 2,000 K and 1,600 K, or more preferably between 1,900 K and 1,700 K, or most preferably between 1,850 K and 1,750 K. Although described in context of these color temperatures, the emitter circuits 311, 312, 313, 314 may be configured to emit light accordingly to any color temperature.

In one example, the first emitter circuit 311 may represent a string of eight LEDs at a color temperature of 5700 K (e.g., the color temperature 211), the second emitter circuit 312 may represent a string of eight LEDs at a color temperature of 3000 K (e.g., the color temperature 212), the third emitter circuit 313 may represent a string of five LEDs at a color temperature of 2200 K (e.g., the color temperature 213), and the fourth emitter circuit 314 may represent a chain of one LED at a color temperature of 1800 K (e.g., the color temperature 214). Although described as comprising four emitter circuits, the controllable lighting device 300 may be include more or less than four emitter circuits that are configured to emit light at different color temperatures, such as three emitter circuits or five, six, seven, etc. emitter circuits (e.g., and that configured with the same or a different number of LEDs). Further, as noted herein, each LED of each emitter circuit 311, 312, 313, 314 may be configured to emit light at nominal or rated color temperature, for example, as defined by ANSI C78.377-2011.

The emitter module 310 may also comprise one or more detectors 316, 318 (e.g., photodiodes) that may produce respective photodiode currents $I_{PD1}$, $I_{PD2}$ (e.g., detector signals) in response to incident light. For example, the first detector 316 may represent a single red, orange or yellow LED or multiple red, orange or yellow LEDs in parallel 3, and the second detector 318 may represent a single green LED or multiple green LEDs in parallel. The emitter module 310 may be mounted on a carrier PCB of the controllable lighting device 300.

The controllable lighting device 300 may comprise a power-board circuit 320 (e.g., a power converter circuit). The power-board circuit 320 may be mounted to a power PCB of the controllable lighting device 300. The power-board circuit 320 may comprise a power converter circuit 322, which may receive a source voltage, such as an AC mains line voltage $V_{AC}$, via a hot connection H and a neutral connection N (e.g., via a screw-in base). Although illustrated as connected to an AC power source (e.g., the AC mains line voltage $V_{AC}$), in other examples the lighting device 300 may be coupled to a direct current (DC) power source.

The power converter circuit 322 may generate a DC bus voltage $V_{BUS}$ (e.g., approximately 15-50V) across a bus capacitor $C_{BUS}$. The power converter circuit 322 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 322 may provide electrical isolation between the AC power source and the emitter circuits 311, 312, 313, 314, and may operate as a power factor correction (PFC) circuit to adjust the power factor of the controllable lighting device 300 towards a power factor of one.

The controllable lighting device 300 may comprise a control-board circuit 330. The control-board circuit 330 may be mounted to a control PCB (e.g., the control PCB 160) of the controllable lighting device 300. The control-board circuit 330 may comprise an LED drive circuit 332 for controlling the power delivered to and an intensity level (e.g., lighting intensity level and/or luminous flux) of the light emitted by each of the emitter circuits 311, 312, 313, 314 of the light source 310. The LED drive circuit 332 may receive the bus voltage $V_{BUS}$ and may adjust magnitudes of respective LED drive currents $I_{LED1}$, $I_{LED2}$, $I_{LED3}$, $I_{LED4}$ conducted through the emitter circuits 311, 312, 313, 314. Although illustrated as a single LED drive circuit, in some examples, the control-board circuit 330 may include a plurality of LED drive circuits, and each of the LED drive circuits may receive the bus voltage $V_{BUS}$ and may adjust magnitudes of respective LED drive currents $I_{LED1}$, $I_{LED2}$, $I_{LED3}$, $I_{LED4}$ conducted through the emitter circuits 311, 312, 313, 314. The LED drive circuit 332 may comprise a regulation circuit, such as a switching regulator (e.g., a buck converter) for controlling the magnitudes of the respective LED drive currents $I_{LED1}$-$I_{LED4}$. An example of the LED drive circuit 332 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference The control-board circuit 330 may comprise an emitter control circuit 336 for controlling the LED drive circuit 332 to control the intensities of the emitter circuits 311, 312, 313, 314 of the light source 310. The emitter control circuit 336 may comprise, for example, a microprocessor, a microcontroller, a programmable logic device (PLD), an application specific integrated circuit (ASIC), a field-programmable gate array (FPGA), or any other suitable processing device or controller. The emitter control circuit 336 may generate one or more drive signals $V_{DR1}$, $V_{DR2}$, $V_{DR3}$, $V_{DR4}$ for controlling the respective LED drive circuits 331, 332, 333, 334. The emitter control circuit 336 may be configured to control the LED drive circuit 332 to control the intensity level and/or the CCT of the light emitted by the controllable lighting device 300. The emitter control circuit 336 may be configured to turn on two (e.g., only two) of the emitter circuits 311, 312, 313, 314 at one time. For example, the emitter control circuit 336 may be configured to control no more than two adjacent emitter circuits 311, 312, 313, 314 at one time, where adjacent emitter circuits are emitter circuits that are closest to one another in color temperature (e.g., along the black body locus) when compared to the respective color temperatures of the other emitters of the controllable lighting device 300. For example, the emitter circuits 311 and 312 may be adjacent, the emitter circuits 312 and 313 may be adjacent, and the emitter circuits 313 and 314 may be adjacent.

The control-board circuit 330 may comprise a receiver circuit 334 that may be electrically coupled to the detectors 316, 318 of the emitter module 310 for generating respective optical feedback signals $V_{FB1}$, $V_{FB2}$ in response to the photodiode currents $I_{PD1}$, $I_{PD2}$. The receiver circuit 334 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$. The emitter control circuit 336 may receive the feedback signal $V_{FB1}$, $V_{FB2}$ and control the LED drive circuits 331, 332, 333, 334 to adjust the average magnitudes of the LED drive currents $I_{LED1}$-$I_{LED4}$ towards respective target currents $I_{TRGT1}$-$I_{TRGT4}$ in response to the feedback signals $V_{FB1}$, $V_{FB2}$.

The emitter module control circuit 336 may receive a plurality of emitter forward-voltage feedback signals $V_{FE1}$, $V_{FE2}$, $V_{FE3}$, $V_{FE4}$ from the LED drive circuit 332 and a plurality of detector forward-voltage feedback signals $V_{FD1}$, $V_{FD2}$ from the receiver circuit 334. The emitter forward-voltage feedback signals $V_{FE1}$-$V_{FE4}$ may be representative of the magnitudes of the forward voltages of the respective emitters 311, 312, 313, 314, which may indicate the color temperatures $T_{E1}$, $T_{E2}$, $T_{E3}$, $T_{E4}$ of the respective emitters. If each emitter 311, 312, 313, 314 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 316, 318, which may indicate the color temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 316, 318.

Although illustrated with a single receiver circuits 334, in some examples, the controllable lighting device 300 may include multiple receiver circuits or no receiver circuits at all. For instance, in some examples, the control-board circuit 330 may include a separate receiver circuit for each LED drive circuit (e.g., in instances where the controllable lighting device 300 includes multiple LED drive circuits). Further, in some examples, the receiver circuit(s) of the controllable lighting device 300 may be configured to generate one or more feedback signals that indicate one or more characteristics of the LED drive circuit(s) and/or emitter circuit(s), such as an optical feedback signal(s), a current feedback signal(s), a voltage feedback signal(s), etc.

The controllable lighting device 300 may comprise a lighting device control circuit 340 that may be electrically coupled to the emitter control circuit 336 via a communication bus 342 (e.g., an $I^2C$ communication bus, serial peripheral interface (SPI) communication bus, etc.). The lighting device control circuit 340 may be configured to control the emitter circuits 311, 312, 313, 314 of the light source 310 to control the intensity level (e.g., lighting intensity level and/or brightness) and/or the color (e.g., the color temperature and/or CCT) of the cumulative light emitted by the controllable lighting device 300. The lighting device control circuit 340 may comprise, for example, a microprocessor, a microcontroller, a programmable logic device (PLD), an application specific integrated circuit (ASIC), a field-programmable gate array (FPGA), or any other suitable processing device or controller.

The lighting device control circuit 340 may be configured to adjust (e.g., dim) a present intensity $L_{PRES}$ (e.g., a present brightness) of the cumulative light emitted by the controllable lighting device 300 towards a target intensity level $L_{TRGT}$ (e.g., a target brightness), which may range across a dimming range of the controllable lighting device, e.g., between a low-end intensity level $L_{LE}$ (e.g., a minimum intensity, such as approximately 0.1%-1.0%) and a high-end intensity level $L_{HE}$ (e.g., a maximum intensity, such as approximately 100%). In some examples, the high-end intensity level $L_{HE}$ and the low-end intensity level $L_{LE}$ are software limits on the dimming range across which the lighting device can control the lighting load.

In some examples, the present intensity $L_{PRES}$ of each emitter (e.g., LED) may be dependent upon the magnitude of the drive current across the emitter. The lighting device control circuit 340 may be configured to adjust a present color temperature $T_{PRES}$ of the cumulative light emitted by the controllable lighting device 300 towards a target color temperature $T_{TRGT}$, which may range between a cool-white color temperature (e.g., approximately 3100-6000 K) and a warm-white color temperature (e.g., approximately 2000-3000 K). In some examples, the present color temperature $T_{PRES}$ of the cumulative light emitted by the controllable lighting device 300 may be dependent upon (e.g., a function of) the magnitude of the drive current across the emitter circuit (e.g., and/or the intensity level of the light emitted by the emitter circuit), and the color temperature of each emitter circuit.

The controllable lighting device 300 may comprise a communication circuit 344 coupled to the lighting device control circuit 340. The communication circuit 344 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. Alternatively or additionally, the communication circuit 344 may be coupled to the hot connection H and the neutral connection N of the controllable lighting device 300 for transmitting a control signal via the electrical wiring using, for example, a power-line carrier (PLC) communication technique. The lighting device control circuit 340 may be configured to determine the target intensity level $L_{TRGT}$ or the target color temperature $T_{TRGT}$ for the controllable lighting device 300 in response to messages (e.g., digital messages) received via the communication circuit 334.

The controllable lighting device 300 may comprise a memory 346 configured to store operational characteristics of the controllable lighting device 300 (e.g., the target intensity level $L_{TRGT}$, the target color temperature $T_{TRGT}$, the low-end intensity level $L_{LE}$, the high-end intensity level $L_{HE}$, etc.). The memory may be implemented as an external integrated circuit (IC) or as an internal circuit of the lighting device control circuit 340. The controllable lighting device 300 may comprise a power supply 348 that may receive the bus voltage $V_{BUS}$ and generate a supply voltage $V_{CC}$ for powering the lighting device control circuit 340 and other low-voltage circuitry of the controllable lighting device. For example, the power supply 348 may be in the control-board circuit 330 and/or the power-board circuit 320.

The memory 346 may comprise a computer-readable storage media or machine-readable storage media that maintains computer-executable instructions for performing one or more as described herein. For example, the memory 346 may comprise computer-executable instructions or machine-readable instructions that include one or more portions of the procedures described herein. The lighting device control circuit 340 and/or the emitter control circuit 336 may access the instructions from memory 346 for being executed to cause the lighting device control circuit 340 and/or the emitter control circuit 336 to operate as described herein, or to operate one or more other devices as described herein. The memory 346 may comprise computer-executable instructions for executing configuration software. The computer-executable instructions may be executed to perform the procedures as described herein. Further, the memory 346 may have stored thereon one or more settings and/or control parameters associated with the controllable lighting device 300.

The controllable lighting device 300 may be configured with one or more user selectable and/or customizable CCT-dimming curves. When configured with a CCT-dimming curve, the lighting device control circuit 340 may be configured to use all or a subset of the emitter circuits of the controllable lighting device 300 to adjust the present intensity $L_{PRES}$ across a dimming range of the controllable lighting device 300 between the low-end intensity level $L_{LE}$ (e.g., a minimum intensity, such as approximately 0.1%-1.0%) and the high-end intensity level $L_{HE}$ (e.g., a maximum intensity, such as approximately 100%). For example, the lighting device control circuit 340 may be configured to control a present intensity level $L_{PRES}$ of the light emitted by the controllable lighting device 300 towards a target intensity level $L_{TRGT}$, and adjust a present color temperature $T_{PRES}$ of the cumulative light emitted by the controllable lighting device 300 towards a target color temperature $T_{TRGT}$, where the target color temperature $T_{TRGT}$ is based on the CCT value of the target intensity level $L_{TRGT}$. Accordingly, the lighting device control circuit 340 may be configured to control the target color temperature $T_{TRGT}$ as a function of the target intensity level $L_{TRGT}$ using the customized CCT-dimming curve. Further, the target intensity level $L_{TRGT}$ may be referred to as a commanded intensity level $L_{CMD}$ when the target intensity level $L_{TRGT}$ is determined in response to an input (e.g., a command) to change the present intensity level $L_{PRES}$ of one or more lighting loads.

As noted above, the controllable lighting device 300 may include all or a subset of the components illustrated in FIG. 3. For instance, in some examples, the controllable lighting device 300 may include the power-board circuit 320 and the control-board circuit 330, but not include the light source 310. In such examples, the light source 310 may be located separate from the controllable lighting device 300 (e.g., as with the LED driver 130 and LED light sources 132 of FIG. 1). In other examples, the controllable lighting device 300 may include the power-board circuit 320 and a portion of the control-board circuit 330, but not include the entirety of the control-board circuit 330 or the light source 310. For example, the controllable lighting device 300 may include the power-board circuit 320, the lighting device control circuit 340, the power supply 348, the communication circuit 344 and the memory 346, but not the emitter control circuit 336, the LED drive circuit 332, or the light source 310. In such examples, the emitter control circuit 336, the LED drive circuit 332, or the light source 310 may reside within a different housing (e.g., in the case of linear lighting loads, track lighting, etc.).

Figure 4:
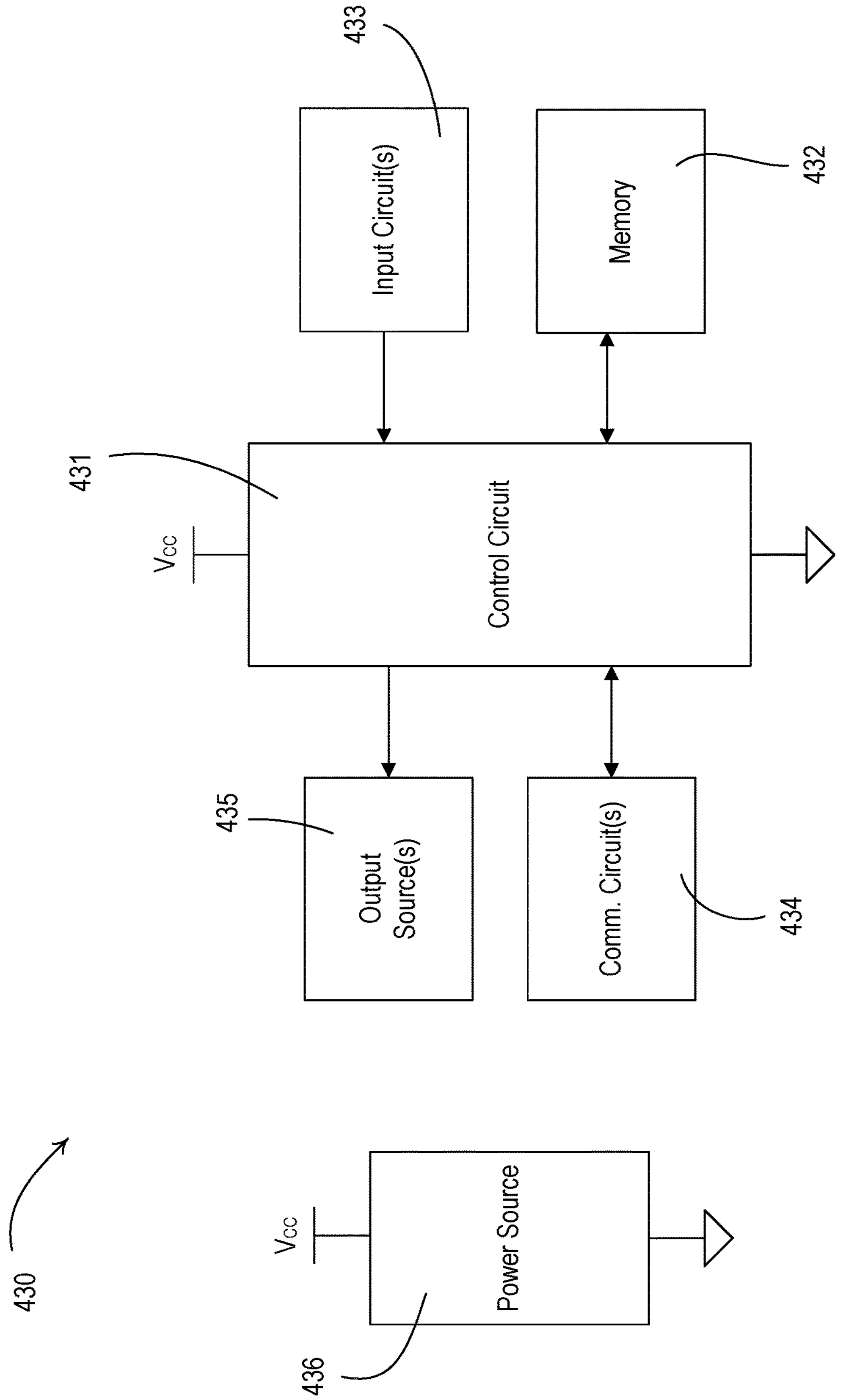
FIG. 4 is a simplified block diagram of an example computing device that may be deployed in the lighting control system illustrated in FIG. 1.

FIG. 4 is a simplified block diagram of an example of a device 430 capable of processing and/or communication in a load control system, such as the lighting control system 100 of FIG. 1. The device 430 may be an example of a computing device 160 (e.g., a smart phone, a laptop, and/or a tablet device) or a remote-control device of the lighting control system 100 (e.g., when the dimmer 140 is configured as a remote-control device). The device 430 may be a control device capable of transmitting or receiving messages.

The device 430 may include a control circuit 431 for controlling the functionality of the device 430. The control circuit 431 may include one or more general purpose processors, special purpose processors, conventional processors, digital signal processors (DSPs), microprocessors, integrated circuits, a programmable logic device (PLD), application specific integrated circuits (ASICs), or the like. The control circuit 431 may perform signal coding, data processing, image processing, power control, input/output processing, or any other functionality that enables the device 431 to perform as one of the devices of the load control system (e.g., load control system 100) described herein.

The control circuit 431 may be communicatively coupled to a memory 432 to store information in and/or retrieve information from the memory 432. The memory 432 may comprise a computer-readable storage media or machine-readable storage media that maintains a device dataset of associated device identifiers, network information, and/or computer-executable instructions for performing as described herein. For example, the memory 432 may comprise computer-executable instructions or machine-readable instructions that include one or more portions of the procedures described herein. The control circuit 431 may access the instructions from memory 432 for being executed to cause the control circuit 431 to operate as described herein, or to operate one or more other devices as described herein. The memory 432 may comprise computer-executable instructions for executing configuration software. For example, the computer-executable instructions may be executed to display a GUI for copying and pasting one or more settings as described herein. The computer-executable instructions may be executed to perform procedures as described herein. Further, the memory 432 may have stored thereon one or more settings and/or control parameters associated with the device 430.

The memory 432 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 432 may be implemented as an external integrated circuit (IC) or as an internal circuit of the control circuit 431.

The device 430 may include one or more communication circuits 434 that are in communication with the control circuit 431 for sending and/or receiving information as described herein. The communication circuit 434 may perform wireless and/or wired communications. The communication circuit 434 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 134 may be configured to communicate via power lines (e.g., the power lines from which the device 130 receives power) using a power line carrier (PLC) communication technique. The communication circuit 434 may be a wireless communication circuit including one or more RF or infrared (IR) transmitters, receivers, transceivers, and/or other communication circuits capable of performing wireless communications.

Though a single communication circuit 434 may be illustrated, multiple communication circuits may be implemented in the device 430. The device 430 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, and the second communication circuit may be configured to communicate via a second wireless communication link (e.g., a short-range or direct wireless communication link) using a second wireless protocol (e.g., a short-range wireless communication protocol).

The control circuit 431 may be in communication with one or more input circuits 433 from which inputs may be received. The input circuits 433 may be included in a user interface for receiving inputs from the user. For example, the input circuits 433 may include an actuator (e.g., a momentary switch that may be actuated by one or more physical buttons) that may be actuated by a user to communicate user input or selections to the control circuit 431. The control circuit may be configured to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 431 of the device 430 may transmit control instructions (e.g., data relating to a customized CCT-dimming curve) in response to an actuation or input from the user on the touch sensitive surface.

The input circuits 433 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 430). The control circuit 431 may receive information from the one or more input circuits 433 and process the information for performing functions as described herein.

The control circuit 431 may be in communication with one or more output sources 435. The output sources 435 may include one or more indicators (e.g., visible indicators, such as LEDs) for providing indications (e.g., feedback) to a user. The output sources 435 may include a display (e.g., a visible display) for providing information (e.g., feedback) to a user. The control circuit 431 and/or the display may generate a graphical user interface (GUI) generated via software for being displayed on the device 430 (e.g., on the display of the device 430).

The user interface of the device 430 may combine features of the input circuits 433 and the output sources 435. For example, the user interface may have buttons that actuate the actuators of the input circuits 433 and may have indicators (e.g., visible indicators) that may be illuminated by the light sources of the output sources 435. In another example, the display and the control circuit 431 may be in two-way communication, as the display may display information to the user and include a touch screen capable of receiving information from a user. The information received via the touch screen may be capable of providing the indicated information received from the touch screen as information to the control circuit 431 for performing functions or control.

Each of the hardware circuits within the device 430 may be powered by a power source 436. The power source 436 may include a power supply configured to receive power from an alternating-current (AC) power supply or direct-current (DC) power supply, for example. In addition, the power source 436 may comprise one or more batteries. The power source 436 may produce a supply voltage $V_{CC}$ for powering the hardware within the device 430.

As described herein, the lighting devices (e.g., the smart bulbs 120*a*, 120*b*, and/or the LED driver 130) may be configured to control the CCT of the cumulative light emitted by the lighting device to be equal to a target color temperature $T_{TRGT}$. The lighting device (e.g., a control circuit of the lighting device) may determine how to mix the light emitted by a plurality of (e.g., two) emitter circuits (e.g., LEDs) of the lighting device to cause the CCT of the cumulative light emitted by the lighting device to be equal to the target color temperature $T_{TRGT}$. For example, the lighting device may control the magnitudes of respective drive currents conducted through the emitter circuits to specific magnitudes based on, for example, the target color temperature $T_{TRGT}$, the target intensity level $L_{TRGT}$, and/or the specific color of each emitter circuit. For example, the lighting device may determine the magnitude of the drive currents based on the lumen values needed from each emitter circuit to generate the target color temperature $T_{TRGT}$. The lighting device may use a table (e.g., stored in memory) and/or one or more equations to determine the lumen values and/or the magnitude of the drive currents necessary to cause the CCT of the cumulative light emitted by the lighting device to be equal to the target color temperature $T_{TRGT}$. Alternatively, the system may send, to the lighting device, the lumen values and/or the magnitude of the drive currents necessary to cause the CCT of the cumulative light emitted by the lighting device to be equal to the target color temperature $T_{TRGT}$.

Further, the lighting device may be configured to adjust the CCT of the light emitted by the lighting device as a function of the intensity level. For instance, the lighting device may be configured to control a present intensity level $L_{PRES}$ of the light emitted by the lighting device towards a target intensity level $L_{TRGT}$, which may range across a dimming range, e.g., between a low-end intensity level $L_{LE}$ (e.g., a minimum intensity, such as approximately 0.1%-1.0%) and a high-end intensity level $L_{HE}$ (e.g., a maximum intensity, such as approximately 100%), and may be configured to adjust a present color temperature $T_{PRES}$ of the cumulative light emitted by the lighting device towards a target color temperature $T_{TRGT}$, which may range between a cool-white color temperature $CCT_{CW}$ (e.g., approximately 3100-6500 K) and a warm-white color temperature $CCT_{WW}$ (e.g., approximately 1500-3000 K).

Further, in some examples, the lighting device may be configured to control the target color temperature $T_{TRGT}$ as a function of the target intensity level $L_{TRGT}$ according to a color temperature (e.g., correlated color temperature) CCT-dimming curve. In some instances, when configured with certain CCT-dimming curves, the lighting device may increase the target color temperature $T_{TRGT}$ as the target intensity level $L_{TRGT}$ is increased, and decrease the target color temperature $T_{TRGT}$ as the target intensity level $L_{TRGT}$ is decreased. Accordingly, the lighting device may control a plurality of emitter circuits to control the light emitted by the lighting device along an intensity range that is associated with the color temperatures (e.g., CCT values) between the emitter circuits, for example, to provide warm dimming, or vice versa (e.g., cool dimming, as described herein).

Figure 5:
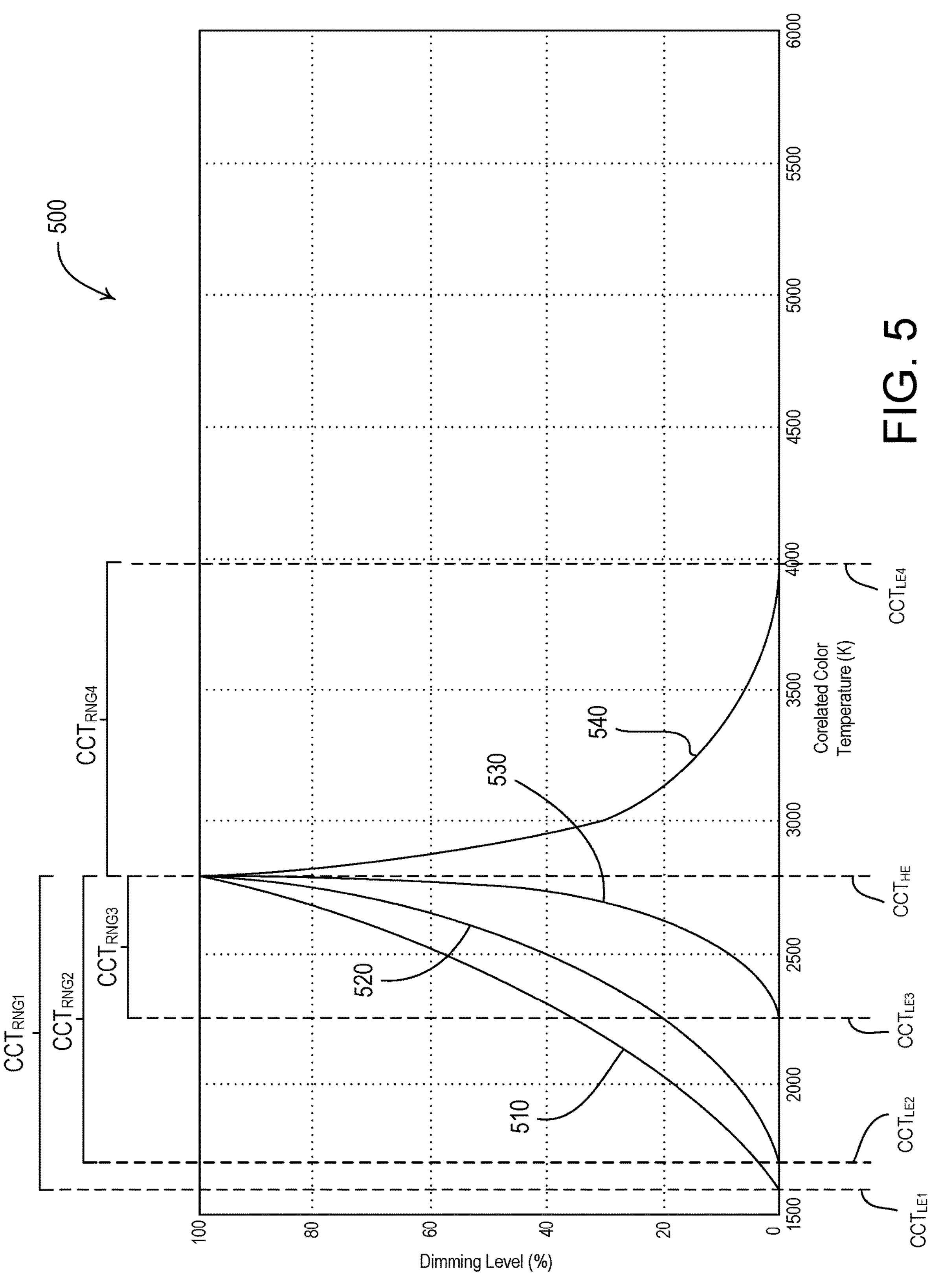
FIG. 5 is a chart that depicts an example of a plurality of selectable dimming curves that may be used by one or more lighting devices of a lighting control system.

FIG. 5 is a chart 500 that depicts an example of a plurality of CCT-dimming curves that may be used by one or more lighting devices (e.g., the smart bulbs 120*a*, 120*b* and/or the LED driver 130 of FIG. 1, the lighting device 200 of FIG. 2, the controllable lighting device 300 of FIG. 3, and/or the device 430 of FIG. 4) of a lighting control system (e.g., the lighting control system 100). The plurality of CCT-dimming curves may include any combination of a plurality of warm dimming curves, daylight dimming curves, and a cool dimming curve, for example, as illustrated in FIG. 5. For instance, the plurality of CCT-dimming curves may include a first CCT-dimming curve 510, a second CCT-dimming curve 520, a third CCT-dimming curve 530, and/or a fourth CCT-dimming curve 540. The dimming level of FIG. 5 may be based on a square law or linear dimming curve (e.g., a dimming level d may be the result of applying a dimming curve to a target intensity level $L_{TRG}$, where the dimming curve may be a linear or square law dimming curve). The CCT-dimming curves may be selectable and/or configurable.

Each CCT-dimming curve may be associated with a different mapping of CCT values across the dimming range (e.g., a different CCT value for each dimming level across the dimming range. For instance, the CCT-dimming curve may define a different CCT value for each of the intensity levels (e.g., dimming levels) of the lighting load. For example, the CCT values may vary from 1500 kelvin (K) to 6500 K, while the dimming range may vary between a low-end intensity level $L_{LE}$ (e.g., a minimum intensity, such as approximately 0.1%-10.0%) and a high-end intensity level $L_{HE}$ (e.g., a maximum intensity, such as approximately 100%). In some instances, the system may define a plurality of dimming levels across the dimming range, such as 256 values (0-255), although ranges with more or less dimming levels may be used. As described in more detail below, the first, second, and third CCT-dimming curves 510, 520, 530 may be defined by CCT values that decrease as the target intensity level $L_{TRGT}$ of the lighting load decreases. The first, second, and third CCT-dimming curves 510, 520, 530 may be referred to as warm dimming curves. The fourth CCT-dimming curve 540 may be defined by CCT values that increase as the target intensity level $L_{TRGT}$ of the lighting load decreases. The fourth CCT-dimming curve 540 may be referred to as a cool dimming curve.

The use of warm dimming curves can be useful because the user only has to adjust a single value, intensity, and the control device and/or lighting device may adjust two different characteristics of the emitted light-intensity and color temperature. For instance, the control device and/or lighting device only needs to transmit or receive a commanded intensity level, and in response, the control device and/or lighting device can be configured to adjust both the intensity and color temperature values of the emitted light.

A CCT-dimming curve (e.g., each CCT-dimming curve) may include and/or be defined by any combination of predefined characteristics, such as a CCT range $CCT_{RNG}$ and a bend value B. The CCT range $CCT_{RNG}$ may define a difference between a high-end CCT value $CCT_{HE}$ (e.g., a maximum CCT value $CCT_{MAX}$) and a low-end CCT value $CCT_{LE}$ (e.g., a minimum CCT value $CCT_{MIN}$), for example, $CCT_{RNG}=|CCT_{HE}-CCT_{LE}|$. The high-end CCT value $CCT_{HE}$ may be the CCT value of the emitted light when the present intensity $L_{PRES}$ of the lighting load is at the high-end intensity level $L_{HE}$, while the low-end CCT value $CCT_{LE}$ may be the CCT value of the emitted light when the present intensity $L_{PRES}$ of the lighting load is at the low-end intensity level $L_{LE}$. The bend value B may define the amount of curvature in the line defining the CCT values across the dimming range between the high-end CCT value $CCT_{HE}$ and the low-end CCT value $CCT_{LE}$. In some examples, the bend may be a decimal value (e.g., a decimal value between 0-1.0).

The lighting control system may be configured to calculate a CCT value for each dimming level across the dimming range (e.g., from the low-end intensity level $L_{LE}$ to the high-end intensity level $L_{HE}$). For example, the lighting control system may determine (e.g., calculate) a CCT value for the dimming level d based on the high-end CCT value $CCT_{HE}$, the low-end CCT value $CCT_{LE}$, and the bend value B of the selected dimming curve. For example, the lighting control system may determine the CCT value for a particular dimming level d based on the following:

$$CCT[d] = \frac{(CCT_{HE} - CCT_{LE}) \cdot (1 + B) \cdot d}{B + d} + CCT_{LE} \quad \text{(Equation 1)}$$

where CCT[d] is the CCT value for the dimming level d, $CCT_{HE}$ is the high-end CCT value, $CCT_{LE}$ is the low-end CCT value, B is the bend value of the selected dimming curve, and d is the dimming level.

For example, the first warm dimming curve 510 may be defined by a high-end CCT value $CCT_{HE}$, a low-end CCT value $CCT_{LE1}$, a first CCT range $CCT_{RNG1}$ (e.g., where $CCT_{RNG1}=|CCD_{HE}-CCD_{LE1}|$), and a first bend value $B_1$. In the example shown in FIG. 5, the high-end CCT value $CCT_{HE}$ value may be approximately 2800 K, the low-end CCT value $CCT_{LE1}$ may be approximately 1600 K, and the first CCT range $CCT_{RNG1}$ may be approximately 12000 K. When configured with the first warm dimming curve 510, the lighting device may be configured to map intensity levels to different CCT values across the first CCT range $CCT_{RNG1}$ (e.g., from the high-end CCT value $CCT_{HE}$ to the low-end CCT value $CCT_{LE1}$) using the first bend value $B_1$. For example, the lighting device may be configured to control the CCT value of the lighting load to be equal to the high-end CCT value $CCT_{HE}$ when the target intensity level $L_{TRGT}$ is set to the high-end intensity level $L_{HE}$, control the CCT value of the lighting load to be equal to the low-end CCT value $CCT_{LE1}$ when the target intensity level $L_{TRGT}$ is set to the low-end intensity level $L_{LE}$, and control the CCT value to a value between the high-end CCT value $CCT_{HE}$ and the low-end CCT value $CCT_{LE1}$ when the target intensity level $L_{TRGT}$ is set between the high-end intensity level $L_{HE}$ and the low-end intensity level $L_{LE}$ based on the first bend value $B_1$.

The second warm dimming curve 520 may be defined by the high-end CCT value $CCT_{HE}$, a low-end CCT value $CCT_{LE2}$, a second CCT range $CCT_{RNG2}$ (e.g., where $CCT_{RNG2}=|CCD_{HE}-CCD_{LE2}|$), and a second bend value $B_2$. In the example shown in FIG. 5, the high-end CCT value $CCT_{HE}$ may be approximately 2800 K, the low-end CCT value $CCT_{LE2}$ may be approximately 1700 K, and the second CCT range $CCT_{RNG2}$ may be approximately 1100 K. Although illustrated as having the same high-end CCT value $CCT_{HE}$ as the first dimming curve 510, in some examples, the second dimming curve 520 may have a different high-end CCT value $CCT_{HE}$. When configured with the second warm dimming curve 520, the lighting device may be configured to map intensity levels to different CCT values across the second CCT range $CCT_{RNG2}$ (e.g., from the high-end CCT value $CCT_{HE}$ to the low-end CCT value $CCT_{LE2}$) using the second bend value $B_2$. For example, the lighting device may be configured to control the CCT value of the lighting load to be equal to the high-end CCT value $CCT_{HE}$ when the target intensity level $L_{TRGT}$ is set to the high-end intensity level $L_{HE}$, control the CCT value of the lighting load to be equal to the low-end CCT value $CCT_{LE2}$ when the target intensity level $L_{TRGT}$ is set to the low-end intensity level $L_{LE}$, and control the CCT value to a value between the high-end CCT value $CCT_{HE}$ and the low-end CCT value $CCT_{LE2}$ when the target intensity level $L_{TRGT}$ is set between the high-end intensity level $L_{HE}$ and the low-end intensity level $L_{LE}$ based on the second bend value $B_2$.

The third warm dimming curve 530 may be defined by the high-end CCT value $CCT_{HE}$, a low-end CCT value $CCT_{LE3}$, a third CCT range $CCT_{RNG3}$ (e.g., where $CCT_{RNG3}=|CCD_{HE}-CCD_{LE3}|$), and a third bend value $B_3$. In the example shown in FIG. 5, the high-end CCT value $CCT_{HE}$ may be approximately 2800 K, the low-end CCT value $CCT_{LE3}$ may be approximately 2250 K, and the third CCT range $CCT_{RNG3}$ may be approximately 550 K. Although illustrated as having the same high-end CCT value $CCT_{HE}$ as the first dimming curve 510 and the second dimming curve 520, in some examples, the third dimming curve 530 may have a different high-end CCT value $CCT_{HE}$. When configured with the third warm dimming curve 530, the lighting device may be configured to map intensity levels to different CCT values across the third CCT range $CCT_{RNG3}$ (e.g., from the high-end CCT value $CCT_{HE}$ to the low-end CCT value $CCT_{LE3}$) using the third bend value $B_3$. For example, the lighting device may be configured to control the CCT value of the lighting load to be equal to the high-end CCT value $CCT_{HE}$ when the target intensity level $L_{TRGT}$ is set to the high-end intensity level $L_{HE}$, control the CCT value of the lighting load to be equal to the low-end CCT value $CCT_{LE3}$ when the target intensity level $L_{TRGT}$ is set to the low-end intensity level $L_{LE}$, and control the CCT value to a value between the high-end CCT value $CCT_{HE}$ and the low-end CCT value $CCT_{LE3}$ when the target intensity level $L_{TRGT}$ is set between the high-end intensity level $L_{HE}$ and the low-end intensity level $L_{LE}$ based on the third bend value $B_3$.

The fourth dimming curve 540 may be defined by a high-end CCT value $CCT_{HE}$, a low-end CCT value $CCT_{LE4}$, a fourth CCT range $CCT_{RNG4}$ (e.g., where $CCT_{RNG3}=|CCD_{HE}-CCD_{LE4}|$), and a fourth bend value $B_4$. In the example shown in FIG. 5, the high-end CCT value $CCT_{HE}$ may be approximately 2800 K, the low-end CCT value $CCT_{LE4}$ may be approximately 4000 K, and the fourth CCT range $CCT_{RNG4}$ may be approximately 1200 K. It should be appreciated that, using the fourth dimming curve 540, the CCT values may increase as the intensity level decreases. When configured with the fourth warm dimming curve 540, the lighting device may be configured to map intensity levels to different CCT values across the fourth CCT range $CCT_{RNG4}$ (e.g., from the high-end CCT value $CCT_{HE}$ to the low-end CCT value $CCT_{LE4}$) using the fourth bend value $B_4$. As noted above, the fourth dimming curve 540 may be defined by CCT values that increase as the target intensity level $L_{TRGT}$ of the lighting load decreases. For example, the lighting device may be configured to control the CCT value of the lighting load to be equal to the high-end CCT value $CCT_{HE}$ when the target intensity level $L_{TRGT}$ is set to the high-end intensity level $L_{HE}$, control the CCT value of the lighting load to be equal to the low-end CCT value $CCT_{LE4}$ when the target intensity level $L_{TRGT}$ is set to the low-end intensity level $L_{LE}$, and control the CCT value to a value between the high-end CCT value $CCT_{HE}$ and the low-end CCT value $CCT_{LE4}$ when the target intensity level $L_{TRGT}$ is set between the high-end intensity level $L_{HE}$ and the low-end intensity level $L_{LE}$ based on the fourth bend value $B_4$.

A lighting control system (e.g., the lighting control system 100) may allow a user to select any of the CCT-dimming curves presented herein, such as the first, second, third, or fourth CCT-dimming curves 510, 520, 530, 540 of FIG. 5. The lighting control system may allow for a user to select and/or configured (e.g., customize) their own CCT-dimming curve for the lighting device (e.g., the smart bulbs 120*a*, 120*b* and/or the LED driver 130). For example, the lighting control system may include a computing device (e.g., the computing device 160), a dimmer (e.g., the dimmer 140), and/or a system controller (e.g., the system controller 150) that may be configured to allow for the user to select and/or configure their own CCT-dimming curve for one or more lighting devices.

In some examples, the lighting control system (e.g., the computing device, the dimmer, and/or the system controller) may allow a user to select a high-end CCT value $CCT_{HE}$ (e.g., or a low-end CCT value $CCT_{LE}$) and a preconfigured curve shape (e.g., a warm dimming curve shape, and/or a cool dimming curve shape, such as the shape of one of the CCT-dimming curves shown in FIG. 5), and the lighting control system may configure (e.g., generate) a CCT-dimming curve (e.g., a custom CCT-dimming curve) using these selections. In some examples, each preconfigured curve shape may be associated with a CCT range $CCT_{RNG}$ and a bend value B. Further, in some instances, the preconfigured curve shape may be associated with an initial high-end CCT value, such as 2800 K. The lighting control system may determine a low-end CCT value $CCT_{LE}$ based on the CCT range $CCT_{RNG}$ and the high-end CCT value $CCT_{HE}$ that was selected by the user (e.g., $CCT_{LE}=CCT_{HE}-CCT_{RNG}$ for a warm or daylight dimming curve, or $CCT_{LE}=CCT_{HE}+CCT_{RNG}$ for a cool dimming curve). The lighting control system may generate the CCT-dimming curve using the selected high-end CCT value $CCT_{HE}$, the low-end CCT value $CCT_{LE}$, and the bend value B of the curve shape. For instance, the lighting control system may fit the selected, preconfigured dimming curve to the high-end CCT value $CCT_{HE}$ and the low-end CCT value $CCT_{LE}$ using the bend value B of the selected dimming curve. As such, the CCT-dimming curve may have the same bend value B and CCT range $CCT_{RNG}$ as the preconfigured curve shape, but with different low-end and high-end CCT values $CCT_{LE}$, $CCT_{HE}$ (e.g., based on the user selected high-end CCT value $CCT_{HE}$). As described in more detail herein, after the CCT-dimming curve is created, the lighting control system may receive a target intensity level $L_{TRGT}$ for the lighting load, determine a target CCT value $CCTT_{TRGT}$ based on the target intensity level $L_{TRGT}$ (e.g., a dimming level d) using the CCT-dimming curve, and control the lighting load to emit light at the target intensity level $L_{TRGT}$ and the target CCT value $T_{TRGT}$ based on the CCT-dimming curve. Therefore, the systems and methods described herein may allow a user to generate a customized CCT-dimming curve using a limited number of user inputs (e.g., a high-end CCT value and a selected curve shape).

Figure 6A:
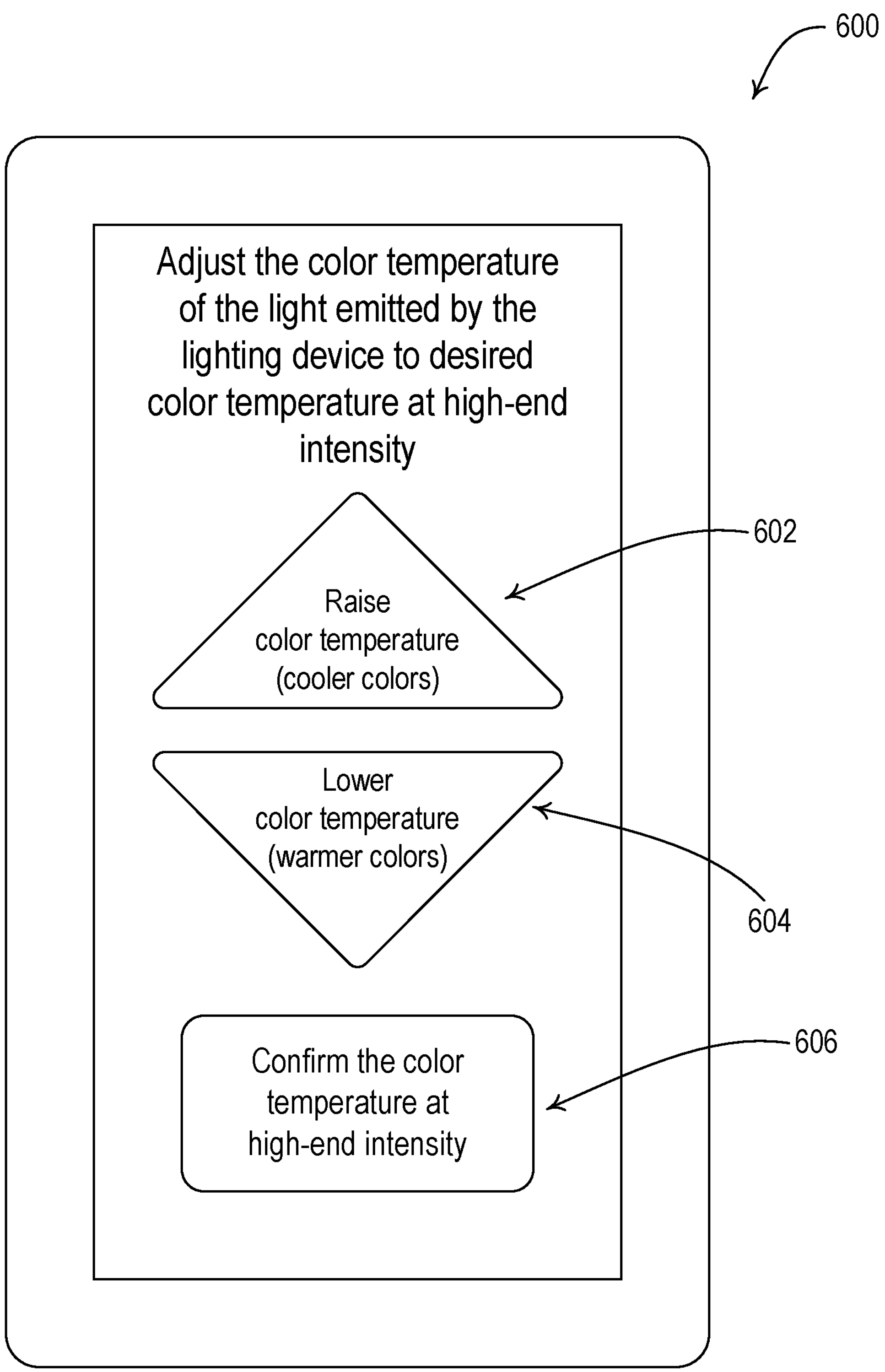
FIGS. 6A-6B are diagrams of example user interfaces of a device used within a lighting control system that is configured to receive one or more user inputs that allow the user to generate a customized CCT-dimming curve.
Figure 6B:
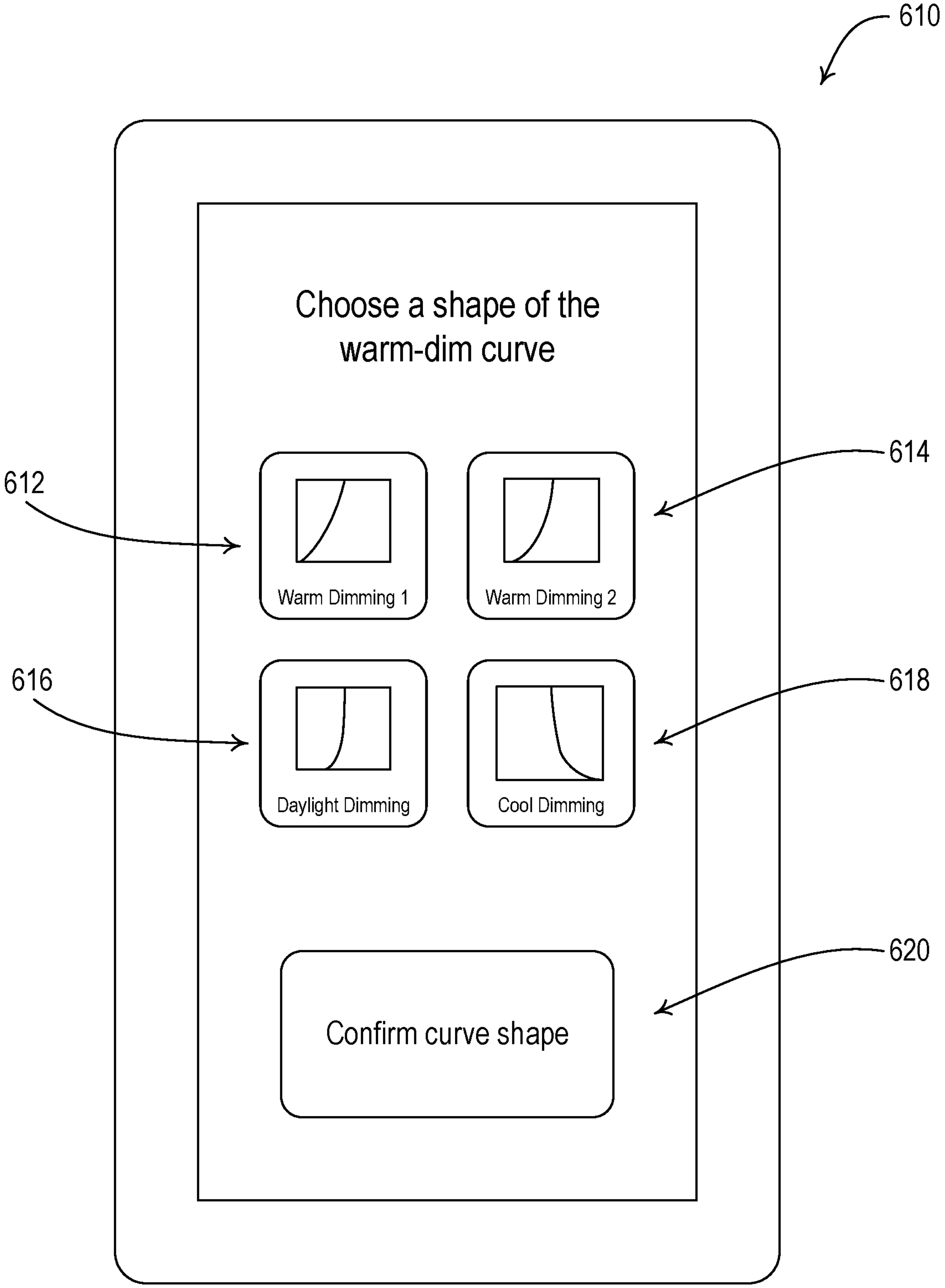

FIGS. 6A-6B are diagrams of example user interfaces 600, 610 of a device used within a lighting control system (e.g., the lighting control system 100) that is configured to receive one or more user inputs that allow the user to generate a customized CCT-dimming curve for a lighting device and/or a load control device. The device may be a computing device (e.g., the computing device 160 and/or the device 430 of FIG. 4), a system controller (e.g., the system controller 160), a load control device (e.g., a dimmer, such as the dimmer 140 of FIG. 1), etc. As noted, the display of the device may include a touch sensitive surface, and the user interface 600 may be presented on the display such that the actuation areas are configured to receive one or more user inputs in response to a user's actuation (e.g., touch) at those locations on the display.

FIG. 6A is a diagram of an example user interface 600 of a device used within a lighting control system (e.g., the lighting control system 100) that is configured to receive user inputs that allow a user to adjust the present color temperature $T_{PRES}$ of a lighting load while the lighting load is at the high-end intensity level $L_{HE}$, and to make a selection of a high-end CCT value for the lighting load when the lighting load is at the high-end intensity level $L_{HE}$.

Prior to the display of the user interface 600, the device (e.g., or other device within the lighting system) may be configured to cause the lighting device to set the present intensity level $L_{PRES}$ of the lighting load to the high-end intensity level $L_{HE}$ (e.g., approximately 100%). The user interface 600 may prompt the user to adjust the present color temperature $T_{PRES}$ of the lighting load while the lighting load is set to the high-end intensity level $L_{HE}$. For example, the user interface 600 may include a GUI that includes an actuation area 602 that allows the user to raise the present color temperature $T_{PRES}$ of the lighting load, and an actuation area 604 that allows the user to lower the present color temperature $T_{PRES}$ of the lighting load. As such, while the lighting load is emitting light at the high-end intensity level $L_{HE}$, the user may be configured to raise or lower the color temperature using the actuations areas 602, 604, respectively, which may allow the user to select their desired color temperature for the lighting load while the lighting load is at the high-end intensity level $L_{HE}$. Once the desired color temperature is identified, the user may actuate the actuation area 606 to confirm the color temperature of the lighting load at the high-end intensity level $L_{HE}$. The device may store the selected color temperature as the high-end CCT value. Thereafter, the device may transmit the high-end CCT value to one or more other devices within the lighting system, such as the lighting device, the system controller, or the load control device.

FIG. 6B is a diagram of an example user interface 610 of a device used within a lighting control system (e.g., the lighting control system 100) that is configured to receive one or more user inputs that allow the user to generate a customized CCT-dimming curve. The device may be configured to generate one or more graphical user interfaces (GUIs), such as the user interface 610, that allow a user to select a curve shape out of a plurality of different curve shapes. The plurality of selectable curve shapes may include a warm CCT-dimming curve shape, a daylight CCT-dimming curve shape, and/or a cool CCT dimming curve shape.

The user interface 610 may allow a user to select from any combination of curve shapes. For example, the user interface 610 may include an actuation area 612 for the selection of a first curve shape (e.g., a first warm dimming curve, such as the first CCT-dimming curve 510), an actuation area 614 for the selection of a second curve shape (e.g., a second warm dimming curve, such as the second CCT-dimming curve 520), an actuation area 616 for the selection of a third curve shape (e.g., a daylight dimming curve, such as the third CCT-dimming curve 530), and/or an actuation area 618 for the selection of a fourth curve shape (e.g., a cool dimming curve, such as the fourth CCT-dimming curve 540). Each curve shape may be characterized by respective a CCT range and bend value B.

The user may select a curve shape by touching one of the actuation areas 612, 614, 616, or 618. The user may confirm the selection of the curve shape by touching an actuation area 620. Thereafter, the device may transmit the selected curve shape (e.g., the CCT range and bend value B for the selected curve shape) to one or more other devices within the lighting system, such as the lighting device, the system controller, or the load control device. Further, after selecting a curve shape but prior to confirming the curve shape, the user may be configured to adjust the present intensity level $L_{PRES}$ of the lighting load to visual the effect that the selected curve shape has the emitted light output from the lighting load as the present intensity level $L_{PRES}$ of the lighting load is adjusted across the dimming range. Accordingly, the user can visual the effect of the selected curve shape prior to confirming the selection.

Figure 6C:
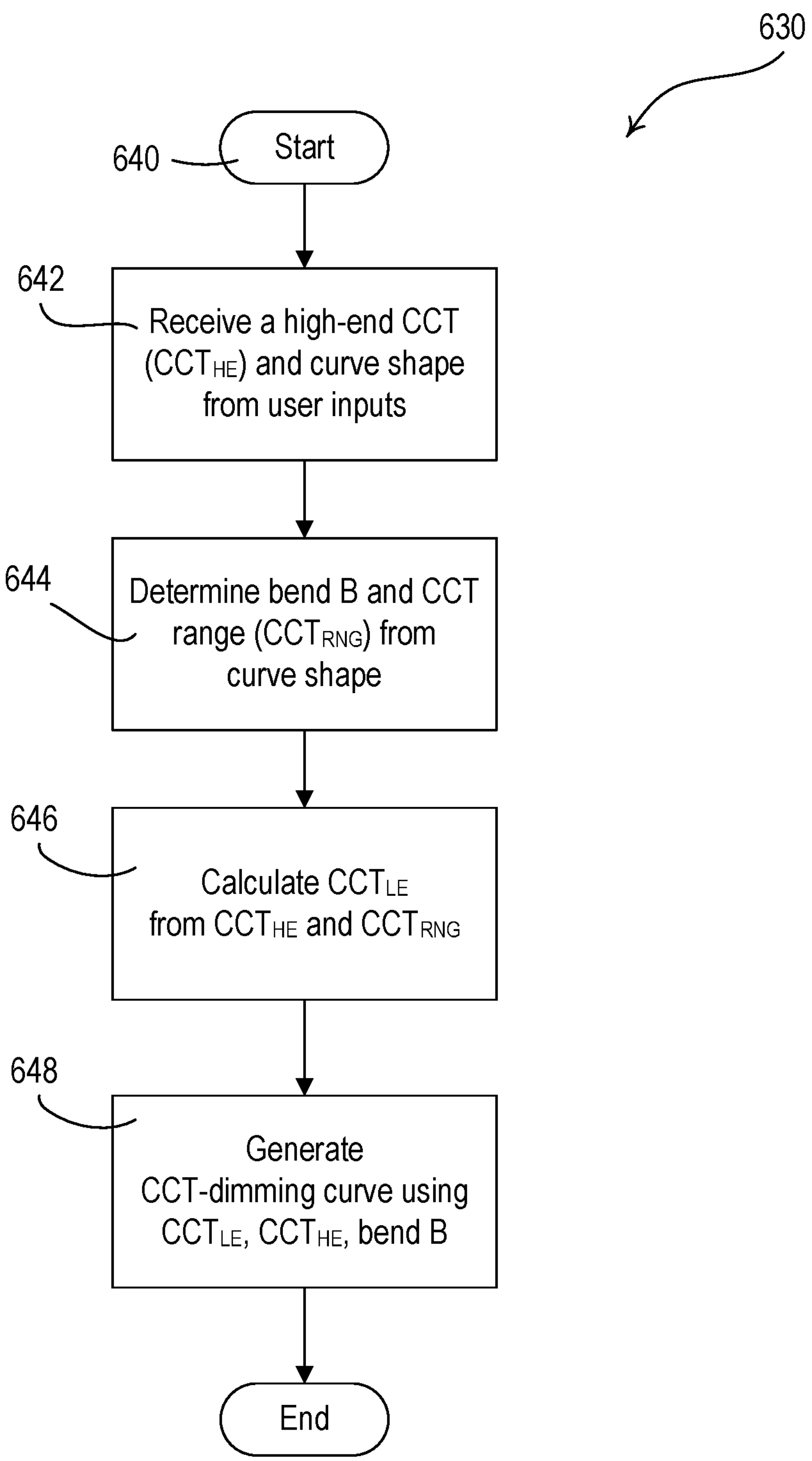
FIG. 6C is a diagram of an example procedure for a device in a lighting control system to generate a customized CCT-dimming curve.

FIG. 6C is a diagram of an example procedure 630 for a device in a lighting control system (e.g., the lighting control system 100) to allow a user to configure (e.g., generate) a CCT-dimming curve (e.g., a customized CCT-dimming curve). The procedure 630 may be performed by a control circuit (e.g., the control circuit 431) of one or more devices of a lighting control system, such as a lighting device (e.g., a smart light bulb, such as the smart bulb 120*a*, 120*b* of the lighting control system 100 of FIG. 1, the lighting device 200 of FIG. 2, and/or the lighting device 300 of FIG. 3), a mobile device (e.g., a computing device, such as the computing device 160 and/or the device 430 of FIG. 4), a system controller (e.g., the system controller 160), etc. The control circuit may perform the procedure 630 in response to receiving one or more user inputs. The control circuit may receive the user inputs via a user interface of the device (e.g., directly or indirectly).

The procedure 630 may begin at 640, for example, in response to the reception of a user input via the user interface that corresponds to the selection of a high-end CCT value $CCT_{HE}$ and a curve shape. For example, the control circuit may receive a high-end CCT value that is selected by a user via a user interface, such as that described in context of FIG. 6A. Further, the control circuit may receive a selection of a curve shape by a user via a user interface, such as that described in context of FIG. 6B. As described herein, the selected curve shape may be associated with a bend value B and/or a CCT range $CCT_{RANGE}$.

At 642, the control circuit may receive a high-end CCT value $CCT_{HE}$ and the selection of a curve shape. For instance, as described here, the user may select one of a plurality of preconfigured curve shapes (e.g., curve shapes corresponding to one of the first, second, third, or fourth dimming curves 510, 520, 530, 540 shown in FIG. 5). The high-end CCT value $CCT_{HE}$ may be a CCT value (e.g., in Kelvin) of the cumulative light emitted by the lighting device when the present intensity level $L_{PRES}$ of the emitted light is at a high-end intensity level $L_{HE}$. In some examples, the user may select the high-end CCT value $CCT_{HE}$ by controlling (e.g., adjusting) the present color temperature $T_{PRES}$ of the light emitted by one or more lighting loads using a device (e.g., a computing device) of the lighting control system. Once the user controls the lighting load to emit light at a color temperature of their choice, the user may select a high-end CCT value $CCT_{HE}$. In such examples, the user may visualize light emitted at the variety of correlated color temperature values to choose from when making their selection of the high-end CCT value $CCT_{HE}$.

At 644, the control circuit may determine a bend value B and a CCT range $CCT_{RNG}$ based on the selected curve shape. For example, the control circuit may retrieve the bend value B and the CCT range $CCT_{RNG}$ from memory of the device. Each curve shape may be associated with (e.g., defined by) a CCT range $CCT_{RNG}$ and a bend value B. The CCT range $CCT_{RNG}$ may define the number of CCT values that the a CCT-dimming curve corresponding to the curve shape may span across a dimming range (e.g., between a high-end intensity level $L_{HE}$ and a low-end intensity level $L_{LE}$). The bend value B may define the amount of curvature in the line defining the CCT values of the resulting CCT-dimming curve across the dimming range. In some examples, the bend B may be a decimal value (e.g., a decimal value between 0-1.0).

At 646, the control circuit may determine (e.g., calculate) a low-end CCT value $CCT_{LE}$ based on the high-end CCT value $CCT_{HE}$ and the CCT range $CCT_{RNG}$. As noted above, the high-end CCT value $CCT_{HE}$ may be selected by the user, while each CCT-dimming curve is associated with (e.g., define by) a CCT range $CCT_{RNG}$. The control circuit may determine the low-end CCT value $CCT_{LE}$ by subtracting the CCT range $CCT_{RNG}$ from the high-end CCT value $CCT_{HE}$ (e.g., $CCT_{LE}=CCT_{HE}-CCT_{RNG}$ for a warm or daylight dimming curve, or $CCT_{LE}=CCT_{HE}+CCT_{RNG}$ for a cool dimming curve). Further, although described in context of the control circuit receiving the high-end CCT value $CCT_{HE}$ at 642, in some examples the control circuit may receive the low-end CCT value $CCT_{LE}$ at 642, and may determine the high-end CCT value $CCT_{HE}$ at 646.

At 648, the control circuit may generate a CCT-dimming curve based on the high-end CCT value $CCT_{HE}$, the low-end CCT value $CCT_{LE}$, and the bend value B. After the customized CCT-dimming curve is generated, the control circuit may configure one or more devices of the lighting control system, such as a load control device (e.g., a dimmer, such as the dimmer 140, an LED driver, such as the LED driver 130, etc.) and/or a lighting device (e.g., a smart bulb, such as the smart bulb 120*a*, 120*b*, etc.), with the customized CCT-dimming curve. Thereafter, the load control device and/or lighting device may be controlled according to the customized CCT-dimming curve. For example, the lighting device may be configured to control the target color temperature $T_{TRGT}$ as a function of the target intensity level $L_{TRGT}$ (e.g., a dimming level d) based on the customized CCT-dimming curve.

Accordingly, a device of the lighting control system (e.g., a computing device, such as the computing device 160 and/or the device 430 of FIG. 4, or a system controller, such as the system controller 160) may be configured to configured to generate a CCT-dimming curve (e.g., a custom CCT-dimming curve) based on limited user inputs. For instance, the computing device may receive a high-end CCT value $CCT_{HE}$ and a selection of a preconfigured curve shaped, and based on these inputs, generate a CCT-dimming curve. In some examples, the computing device may control the present intensity level $L_{PRES}$ of a lighting load to the high-end intensity level $L_{HE}$ and prompt the user to adjust and select a CCT value for the high-end intensity level $L_{HE}$ (e.g., $CCT_{HE}$), for example, via a display device of the computing device. The computing device may also ask the user to select one of a plurality of preconfigured curve shapes. For instance, the computing device may present the plurality of preconfigured curve shapes (e.g., via the display device of the computing device), and prompt the user to select one. Based on the selection of the high-end $CCT_{HE}$ value and the preconfigured curve shape, the computing device may generate a CCT-dimming curve and/or transmit these values elsewhere for the CCT-dimming curve to be generated by another device of the lighting control system.

In some examples, a combination of devices may perform the procedure 630. For instance, the procedure 630 may be performed by a lighting device. In such examples, the lighting device may receive the high-end CCT value $CCT_{HE}$ and the selection of a curve shape from a computing device, such as a mobile phone, and may perform the remaining steps 644-648 at the lighting device. Alternatively, a computing device, such as a mobile phone, may perform the procedure 630. In such instances, after calculating the low-end CCT value, the computing device may generate and transmit the CCT-dimming curve to the lighting device, or may transmit a subset of high-end CCT value, the low-end CCT value, the CCT range $CCT_{RANGE}$, and/or the bend value B.

As another example, in some instances the device may perform the procedure 630 and transmit the CCT-dimming curve (e.g., or a subset of high-end CCT value, the low-end CCT value, the CCT range $CCT_{RANGE}$, and/or the bend value B) to a system controller of the lighting system. In such examples, the system controller may generate the CCT-dimming curve using the received CCT-dimming curve data and store the CCT-dimming curve in memory. Thereafter, the system controller may receive a command to change the present intensity level $L_{PRES}$ of the lighting load, and in response, determine an associated CCT value for the commanded intensity level $L_{CMD}$ using the CCT-dimming curve, and transmit both the commanded intensity level $L_{CMD}$ and determined CCT value to the lighting load.

Alternatively or additionally, the lighting control system (e.g., the lighting control system 100) may generate a customized CCT-dimming curve based on a user's selection of a plurality (e.g., three) CCT values, where each CCT value is associated with a different intensity level across the dimming range. In such examples, the lighting control system may not require that a user select a preconfigured CCT-dimming curve, but rather, may allow the user to select a plurality of (e.g., three) different sets of CCT values and intensity levels for one or more lighting loads. The lighting control system may determine a bend value B based on the plurality of CCT values and intensity levels, and may generate a customized CCT-dimming curve based on the plurality of CCT values and intensity levels and the bend value B.

Figure 6D:
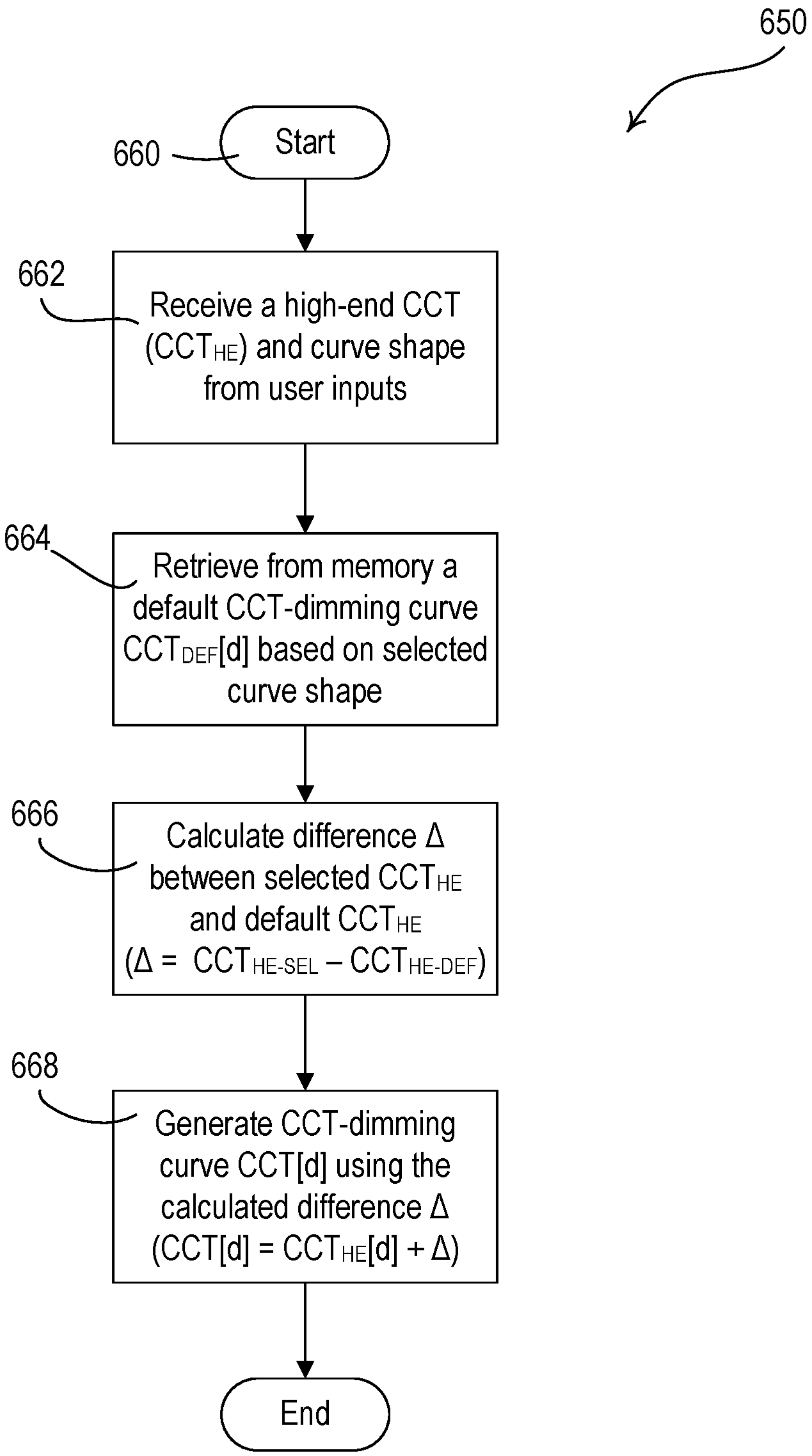
FIG. 6D is a diagram of an example procedure for a device in a lighting control system to allow a user to generate a customized CCT-dimming curve.

FIG. 6D is a diagram of an example procedure 660 for a device in a lighting control system (e.g., the lighting control system 100) to allow a user to configure (e.g., generate) a CCT-dimming curve CCT[d] (e.g., a customized CCT-dimming curve). The procedure 660 may be performed by a control circuit (e.g., the control circuit 431) of one or more devices of a lighting control system, such as a lighting device (e.g., a smart light bulb, such as the smart bulb 120*a*, 120*b* of the lighting control system 100 of FIG. 1, the lighting device 200 of FIG. 2, and/or the lighting device 300 of FIG. 3), a mobile device (e.g., a computing device, such as the computing device 160 and/or the device 430 of FIG. 4), a system controller (e.g., the system controller 160), etc. The control circuit may perform the procedure 660 in response to receiving one or more user inputs. The control circuit may receive the user inputs via a user interface of the device.

The procedure 660 may begin at 662, for example, in response to the reception of a user input via the user interface that corresponds to the selection of a selected high-end CCT value $CCT_{HE\text{-}SEL}$ and a curve shape. For example, the control circuit may receive a high-end CCT value that is selected by a user via a user interface (e.g., the selected high-end CCT value $CCT_{HE\text{-}SEL}$), such as that described in context of FIG. 6A. Further, the control circuit may receive a selection of a curve shape by a user via a user interface, such as that described in context of FIG. 6B. As described herein, the selected curve shape may be associated with a bend value B and/or a CCT range $CCT_{RANGE}$.

At 664, the control circuit may retrieve a default CCT-dimming curve $CCT_{DEF}$[d] from memory of the device based on the selected curve shape. In some examples, the device may have a plurality of curve shapes stored in memory. The default CCT-dimming curve $CCT_{DEF}$[d] may be the first CCT-dimming curve 510, the second CCT-dimming curve 520, the third CCT-dimming curve 530, and/or the fourth CCT-dimming curve 540 (e.g., as shown in FIG. 5). The default CCT-dimming curve $CCT_{DEF}$[d] may define a default high-end CCT value $CCT_{HE\text{-}DEF}$ (e.g., 2800 K).

At 666, the control circuit may determine the difference Δ between a selected high-end CCT value $CCT_{HE\text{-}SEL}$ (from 662) and the default high-end CCT value $CCT_{HE\text{-}DEF}$ of the default CCT-dimming curve $CCT_{DEF}$[d] by subtracting the default high-end CCT value $CCT_{HE\text{-}DEF}$ from the selected high-end CCT value $CCT_{HE\text{-}SEL}$, e.g., $\Delta = CCT_{HE\text{-}SEL} - CCT_{HE\text{-}DEF}$. The control circuit may shift the default CCT-dimming curve $CCT_{DEF}$[d] based on the difference Δ between selected high-end CCT value $CCT_{HE\text{-}SEL}$ and the default high-end CCT value $CCT_{HE\text{-}DEF}$ of the default CCT-dimming curve $CCT_{DEF}$[d] to generate the CCT-dimming curve CCT[d]. At 668, the control circuit may generate the CCT-dimming curve CCT[d] based on the difference calculated at 666.

Figure 7A:
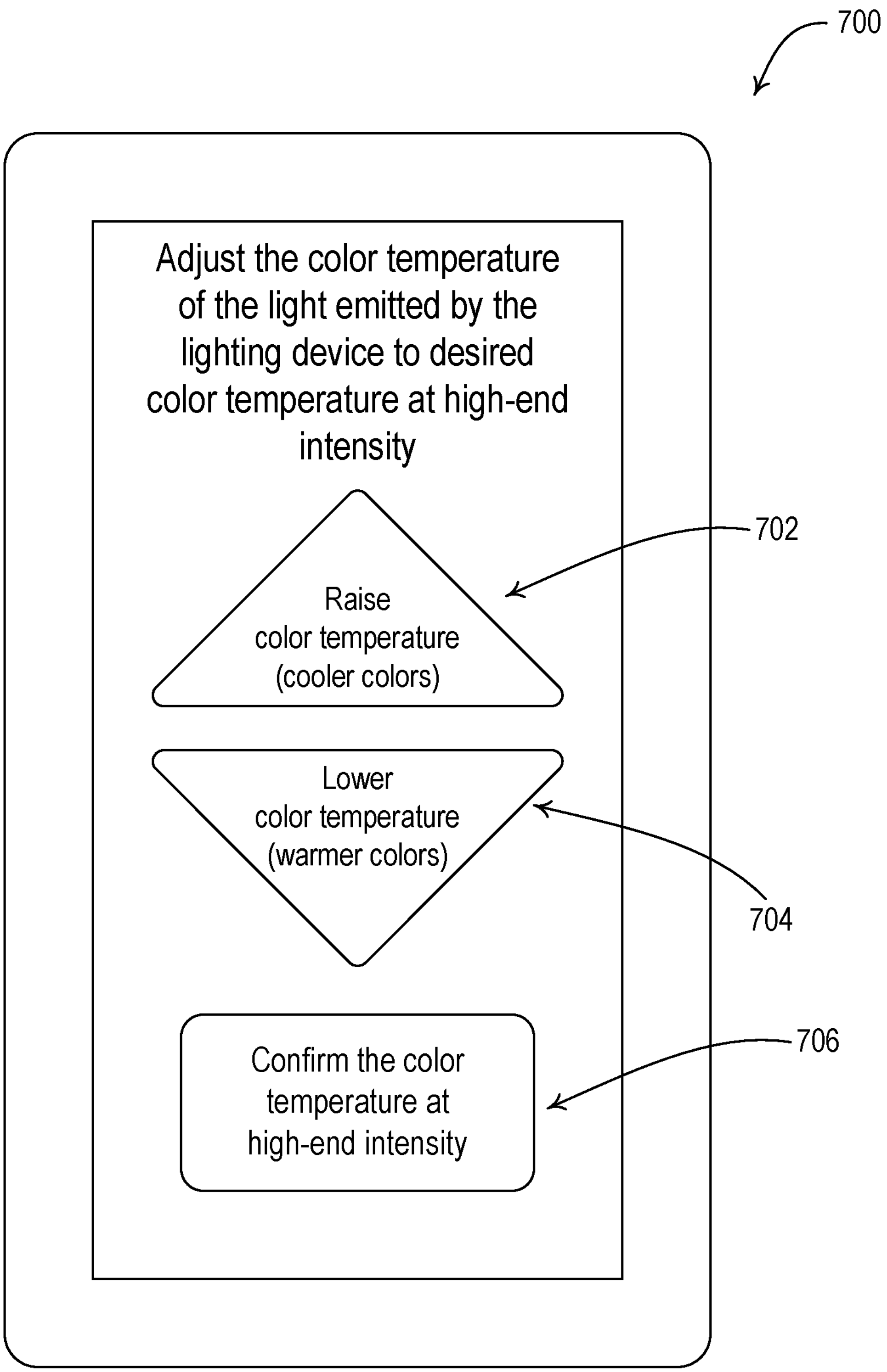
FIGS. 7A-C are diagrams of example user interfaces of a device used within a lighting control system that is configured to receive one or more user inputs that allow the user to generate a customized CCT-dimming curve.
Figure 7B:
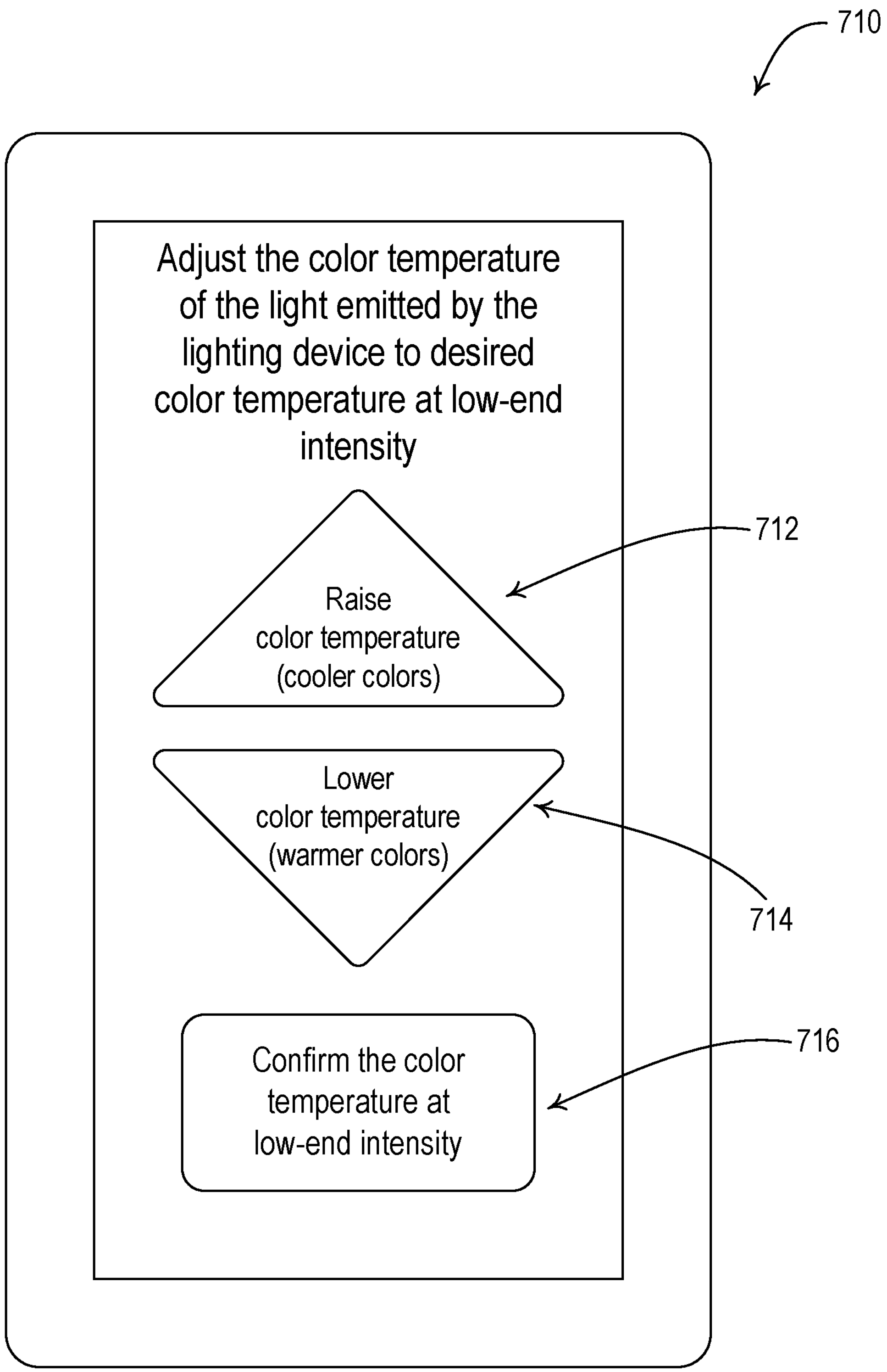
Figure 7C:
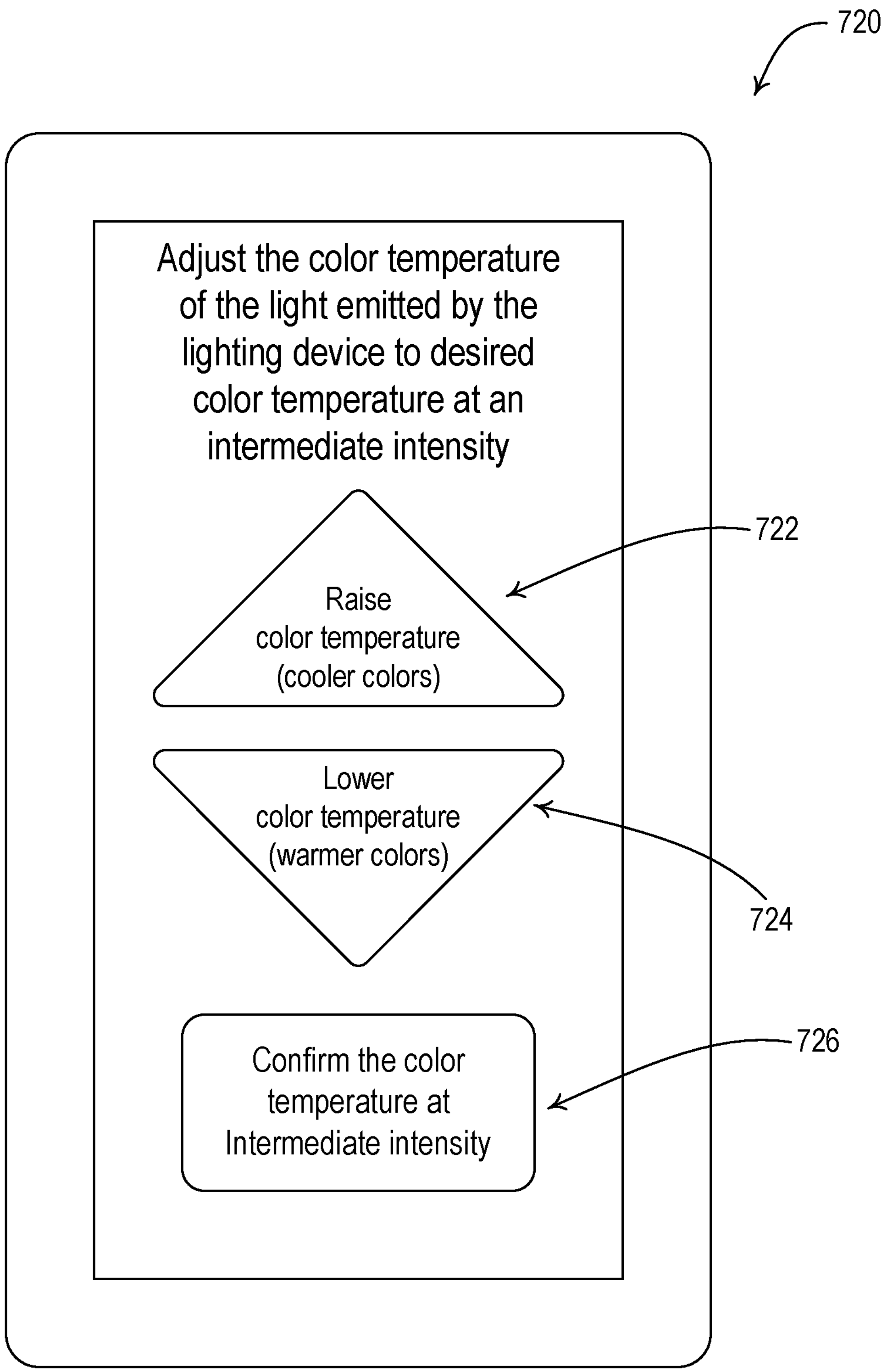

FIGS. 7A-C are diagrams of example user interfaces 700, 710, 720 of a device used within a lighting control system (e.g., the lighting control system 100) that is configured to receive one or more user inputs that allow the user to generate a customized CCT-dimming curve for a lighting device and/or a load control device. The device may be a computing device (e.g., the computing device 160 and/or the device 430 of FIG. 4), a system controller (e.g., the system controller 160), a load control device (e.g., a dimmer, such as the dimmer 140 of FIG. 1), etc. As noted, the display of the device may include a touch sensitive surface, and the user interfaces 700, 710, and 720 may be presented on the display such that one or more actuation areas are configured to receive one or more user inputs in response to a user's actuation (e.g., touch) at those locations on the display.

FIG. 7A is a diagram of an example user interface 700 of a device used within a lighting control system (e.g., the lighting control system 100) that is configured to receive user inputs that allow a user to adjust the present color temperature $T_{PRES}$ of a lighting load while the lighting load is at the high-end intensity level $L_{HE}$, and to make a selection of a high-end CCT value for the lighting load when the lighting load is at the high-end intensity level $L_{HE}$.

Prior to the display of the user interface 700, the device (e.g., or other device within the lighting system) may be configured to cause the lighting device to set the present intensity level $L_{PRES}$ of the lighting load to the high-end intensity level $L_{HE}$ (e.g., approximately 100%). The user interface 700 may prompt the user to adjust the present color temperature $T_{PRES}$ of the lighting load while the lighting load is set to the high-end intensity level $L_{HE}$. For example, the user interface 700 may include a GUI that includes an actuation area 702 that allows the user to raise the present color temperature $T_{PRES}$ of the lighting load, and an actuation area 704 that allows the user to lower the present color temperature $T_{PRES}$ of the lighting load. As such, while the lighting load is emitting light at the high-end intensity level $L_{HE}$, the user may be configured to raise or lower the color temperature using the actuations areas 702, 704, respectively, which may allow the user to select their desired color temperature for the lighting load while the lighting load is at the high-end intensity level $L_{HE}$. Once the desired color temperature is identified, the user may actuate the actuation area 706 to confirm the color temperature of the lighting load at the high-end intensity level $L_{HE}$. The device may store the selected color temperature as the high-end CCT value. Thereafter, the device may transmit the high-end CCT value to one or more other devices within the lighting system, such as the lighting device, the system controller, or the load control device.

FIG. 7B is a diagram of an example user interface 710 of a device used within a lighting control system (e.g., the lighting control system 100) that is configured to receive user inputs that allow a user to adjust the present color temperature $T_{PRES}$ of a lighting load while the lighting load is at the low-end intensity level $L_{LE}$, and to make a selection of a low-end CCT value for the lighting load when the lighting load is at the low-end intensity level $L_{LE}$.

Prior to the display of the user interface 710, the device (e.g., or other device within the lighting system) may be configured to cause the lighting device to set the present intensity level $L_{PRES}$ of the lighting load to the low-end intensity level $L_{HE}$ (e.g., approximately 0.1%-1.0%). The user interface 710 may prompt the user to adjust the present color temperature $T_{PRES}$ of the lighting load while the lighting load is set to the low-end intensity level $L_{LE}$. For example, the user interface 710 may include a GUI that includes an actuation area 712 that allows the user to raise the present color temperature $T_{PRES}$ of the lighting load, and an actuation area 714 that allows the user to lower the present color temperature $T_{PRES}$ of the lighting load. As such, while the lighting load is emitting light at the low-end intensity level $L_{LE}$, the user may be configured to raise or lower the color temperature using the actuations areas 712, 714, respectively, which may allow the user to select their desired color temperature for the lighting load while the lighting load is at the low-end intensity level $L_{LE}$. Once the desired color temperature is identified, the user may actuate the actuation area 716 to confirm the color temperature of the lighting load at the low-end intensity level $L_{LE}$. The device may store the selected color temperature as the low-end CCT value. Thereafter, the device may transmit the high-end CCT value to one or more other devices within the lighting system, such as the lighting device, a system controller, or a load control device.

Although described as being approximately 100% and 0.1%-1.0%, it should be appreciated that, in some examples, when describing high-end CCT value and the low-end CCT value, the high-end intensity level may be within 10% of the true high-end intensity level of the lighting load (e.g., approximately 100%), and the low-end intensity level may be within 10% of the true low-end intensity level of the lighting load (e.g., approximately 0.1%-1.0%), such that the high-end CCT value and/or the low-end CCT value may not actually be associated with the true high-end intensity and/or low-end intensity of the lamp, but rather with a value that is close to the true high-end or low-end intensity level.

FIG. 7C is a diagram of an example user interface 720 of a device used within a lighting control system (e.g., the lighting control system 100) that is configured to receive user inputs that allow a user to adjust the present color temperature $T_{PRES}$ of a lighting load while the lighting load is at an intermediate intensity level $L_{INT}$, and to make a selection of an intermediate CCT value for the lighting load when the lighting load is at the intermediate intensity level $L_{INT}$.

Prior to the display of the user interface 720, the device (e.g., or other device within the lighting system) may be configured to cause the lighting device to set the present intensity level $L_{PRES}$ of the lighting load to an intermediate intensity level $L_{INT}$. The intermediate intensity level $L_{INT}$ may be predetermined (e.g., approximately 50%) or may be selected by the user. The intermediate intensity level $L_{INT}$ may reside between the low-end intensity level $L_{LE}$ and the high-end intensity level $L_{HE}$.

The user interface 720 may prompt the user to adjust the present color temperature $T_{PRES}$ of the lighting load while the lighting load is set to the intermediate intensity level $L_{INT}$. For example, the user interface 720 may include a GUI that includes an actuation area 722 that allows the user to raise the present color temperature $T_{PRES}$ of the lighting load, and an actuation area 724 that allows the user to lower the present color temperature $T_{PRES}$ of the lighting load. As such, while the lighting load is emitting light at the intermediate intensity level $L_{INT}$, the user may be configured to raise or lower the color temperature using the actuations areas 722, 724, respectively, which may allow the user to select their desired color temperature for the lighting load while the lighting load is at the intermediate intensity level $L_{INT}$. Once the desired color temperature is identified, the user may actuate the actuation area 726 to confirm the color temperature of the lighting load at the intermediate intensity level $L_{INT}$. The device may store the selected color temperature as the low-end CCT value. Thereafter, the device may transmit the intermediate CCT value to one or more other devices within the lighting system, such as the lighting device, a system controller, or a load control device. Further, in some examples, the device may be configured to generate a user interface that prompts the user to select the intermediate intensity level $L_{INT}$. For instance, the device may generate the user interface that allows the user to adjust and select the intermediate intensity level $L_{INT}$ (e.g., potentially within some bounds, like between 30%-60%), and the device may send a control signal that includes a command to adjust the intermediate intensity level $L_{INT}$ of the lighting device to the commanded intensity level $L_{CMD}$.

Figure 7D:
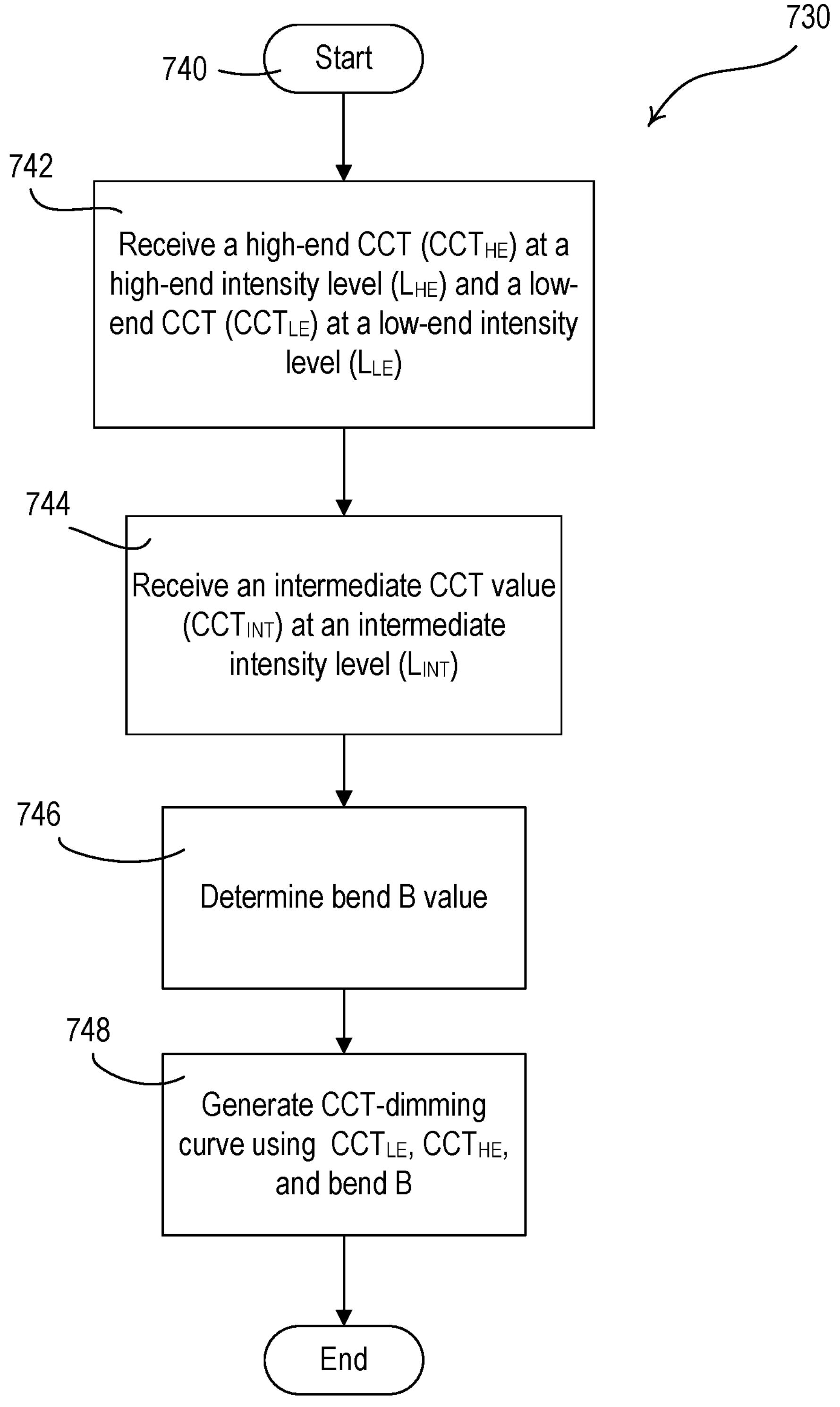
FIG. 7D is a diagram of an example procedure for a device in a lighting control system to generate a customized CCT-dimming curve.

FIG. 7D is a diagram of an example procedure 730 for a device in a lighting control system (e.g., the lighting control system 100) to allow a user to configure (e.g., generate) a CCT-dimming curve (e.g., a customized CCT-dimming curve). The procedure 730 may be performed by a control circuit (e.g., the control circuit 431) of one or more devices of a lighting control system, such as a lighting device (e.g., a smart light bulb, such as the smart bulb 120*a*, 120*b* of the lighting control system 100 of FIG. 1, the lighting device 200 of FIG. 2, and/or the lighting device 300 of FIG. 3), a mobile device (e.g., a computing device, such as the computing device 160 and/or the device 430 of FIG. 4), a system controller (e.g., the system controller 160), etc. The control circuit may perform the procedure 730 in response to receiving one or more user inputs. The control circuit may receive the user inputs via a user interface of the device.

The procedure 730 may begin at 740, for example, in response to the reception of a user input via the user interface that corresponds to the selection of a customized CCT-dimming curve selection. At 742, the control circuit may receive a high-end CCT value $CCT_{HE}$ and a low-end CCT value $CCT_{LE}$. For example, the control circuit may receive a selection for the high-end CCT value $CCT_{HE}$ when the present intensity level $L_{PRES}$ of the lighting load is at a high-end intensity level $L_{HE}$ (e.g., an intensity level of approximately 100%) and the low-end CCT value $CCT_{LE}$ when the present intensity level $L_{PRES}$ of the lighting load is at a low-end intensity level $L_{LE}$ (e.g., an intensity level of approximately 0.1%-10.0%). For instance, the high-end intensity level $L_{HE}$ and the low-end intensity level $L_{LE}$ may be set by the lighting load and/or selectable by the user. For example, the control circuit may receive a high-end CCT value $CCT_{HE}$ that is selected by a user via a user interface, such as that described in context of FIG. 7A, and receive a low-end CCT value $CCT_{LE}$ that is selected by a user via a user interface, such as that described in context of FIG. 7B.

In some examples, the control circuit may set the present intensity level $L_{PRES}$ of the lighting load to the high-end intensity level $L_{HE}$, allow the user to adjust the CCT value of the emitted light, and receive confirmation (e.g., a selection) of a high-end CCT value $CCT_{HE}$ from the user when the user finds the CCT value they prefer for the high-end intensity level $L_{HE}$. Similarly, the control circuit may set the present intensity level $L_{PRES}$ of the lighting load to the low-end intensity level $L_{LE}$, allow the user to adjust the CCT value of the emitted light, and receive confirmation (e.g., a selection) of a low-end CCT value $CCT_{LE}$ from the user when the user finds the CCT value they prefer for the low-end intensity level $L_{LE}$. Accordingly, the control circuit may receive a high-end CCT value $CCT_{HE}$ for the high-end intensity level $L_{HE}$, and a low-end CCT value $CCT_{LE}$ for the low-end intensity level $L_{LE}$.

At 744, the control circuit may receive an intermediate CCT value $CCT_{INT}$. For example, the control circuit may allow the user to select an intermediate intensity level $L_{INT}$, and when the lighting load is emitting light at the intermediate intensity level $L_{INT}$, the control circuit may allow the user to adjust and select the intermediate CCT value $CCT_{INT}$ for the intermediate intensity level $L_{INT}$. For example, the control circuit may receive an intermediate CCT value that is selected by a user via a user interface, such as that described in context of FIG. 7C. In some examples, the control circuit may limit (e.g., restrict) the intermediate intensity level $L_{INT}$ to be within a limited intensity range of the lighting load (e.g., between 10% and 30% intensity level). That is, in some examples, the system may require that the user select the intermediate CCT value $CCT_{INT}$ for an intermediate intensity level $L_{INT}$ (e.g., a dimming level d) that is within a predefined range, such as near low-end (e.g., between 10%-30% intensity level). Further, in some examples, the control circuit may have a predefined intermediate intensity level $L_{INT}$, and the user may not be allowed to select or adjust the intermediate intensity level $L_{INT}$.

As such, each of the plurality of CCT values may be associated with an intensity level (e.g., a different intensity level). For example, the high-end CCT value $CCT_{HE}$ may be associated with the high-end intensity level $L_{HE}$ of the lighting load, the low-end CCT value $CCT_{LE}$ may be associated with the low-end intensity level $L_{LE}$ of the lighting load, and the intermediate CCT value $CCT_{INT}$ may be associated with the intermediate intensity level $L_{INT}$ of the lighting load. The intermediate CCT value $CCT_{INT}$ may reside between the low-end CCT value $CCT_{LE}$ and the customized high-end CCT value $CCT_{HE}$, and the intermediate intensity level $L_{INT}$ may reside between the low-end intensity level $L_{LE}$ and the high-end intensity level $L_{HE}$.

At 746, the control circuit may determine a bend value B for a dimming curve based on the high-end CCT value $CCT_{HE}$, the high-end intensity level $L_{HE}$, the low-end CCT value $CCT_{LE}$, the low-end intensity level $L_{LE}$, the intermediate CCT value $CCT_{INT}$, and the intermediate intensity level $L_{INT}$. For example, the control circuit may fit the CCT-dimming curve to the selected CCT values based on the intensity level associated with each CCT value (e.g., using Equation 1 defined herein), and based on the fit, the control circuit may determine the bend value B for the dimming curve. For instance, the control circuit may determine a bend value B that causes the dimming curve to start at the high-end CCT value $CCT_{HE}$ when the lighting load is at the high-end intensity level $L_{HE}$, end at the low-end CCT value $CCT_{LE}$ when the lighting load is at the low-end intensity level $L_{LE}$, and pass through the intermediate CCT value $CCT_{INT}$ when the lighting load is at the intermediate intensity level $L_{INT}$. For instance, referring to Equation 1 and for example, $CCT_{HE}$ and $CCT_{LE}$ are known, and the dimming level d is based on the intermediate intensity level $L_{INT}$. As such, in some examples, the bend value B may be solved for by setting d equal to the intermediate intensity level $L_{INT}$ and CCT[d] equal to the intermediate CCT value $CCT_{INT}$.

At 748, the control circuit may generate the CCT-dimming curve using the low-end CCT value $CCT_{LE}$, the high-end CCT value $CCT_{HE}$, and the bend value B (e.g., and in some examples, also based on the low-end intensity level $L_{LE}$ and the high-end intensity level $L_{HE}$). As such, the control circuit may generate the CCT-dimming curve based on a user's selection of three CCT values, where each CCT value is associated with a different intensity level across the dimming range. After the CCT-dimming curve is generated, the control circuit may configure one or more devices of the lighting control system, such as a load control device (e.g., a dimmer, such as the dimmer 140, an LED driver, such as the LED driver 130, etc.) and/or a lighting device (e.g., a smart bulb, such as the smart bulb 120*a*, 120*b*, etc.), with the CCT-dimming curve. Thereafter, the load control device and/or lighting device may be controlled according to the CCT-dimming curve. For example, the lighting device may be configured to control the target color temperature $T_{TRGT}$ as a function of the target intensity level $L_{TRGT}$ based on the CCT-dimming curve.

Accordingly, a device of the lighting control system (e.g., a computing device, such as the computing device 160 and/or the device 430 of FIG. 4, or a system controller, such as the system controller 160, may be configured to generate a custom CCT-dimming curve based on limited user inputs. For instance, the computing device may receive a plurality of CCT values (e.g., such as the high-end CCT value $CCT_{HE}$, the low-end CCT value $CCT_{LE}$, and the intermediate CCT value $CCT_{INT}$), and based on these CCT values and the respective intensity level associated with each, generate a customized CCT-dimming curve. In some examples, the computing device may control the present intensity level $L_{PRES}$ of a lighting load to the high-end intensity level $L_{HE}$ and prompt the user to adjust and select a CCT value for the high-end intensity level $L_{HE}$ (e.g., $CCT_{HE}$), for example, via a display device of the computing device. The computing device may control the present intensity level $L_{PRES}$ of the lighting load to the low-end intensity level $L_{LE}$ and prompt the user to adjust and select a CCT value for the low-end intensity level $L_{LE}$ (e.g., $CCT_{LE}$), for example, via the display device of the computing device. The computing device may allow the user to select an intermediate intensity level $L_{INT}$, control the lighting device to emit light at the intermediate intensity level $L_{INT}$, and prompt the user to adjust and select a CCT value for the intermediate intensity level $L_{INT}$ (e.g., $CCT_{INT}$), for example, via the display device of the computing device. Based on the selection of the high-end CCT value $CCT_{HE}$, the low-end CCT value $CCT_{LE}$, the intermediate CCT value $CCT_{INT}$, and the respective intensity levels for each CCT value (e.g., $L_{HE}$, $L_{LE}$, $L_{INT}$, respectively), the computing device may generate a customized CCT-dimming curve and/or transmit these values elsewhere for the customized CCT-dimming curve to be generated by another device of the lighting control system.

Figure 8:
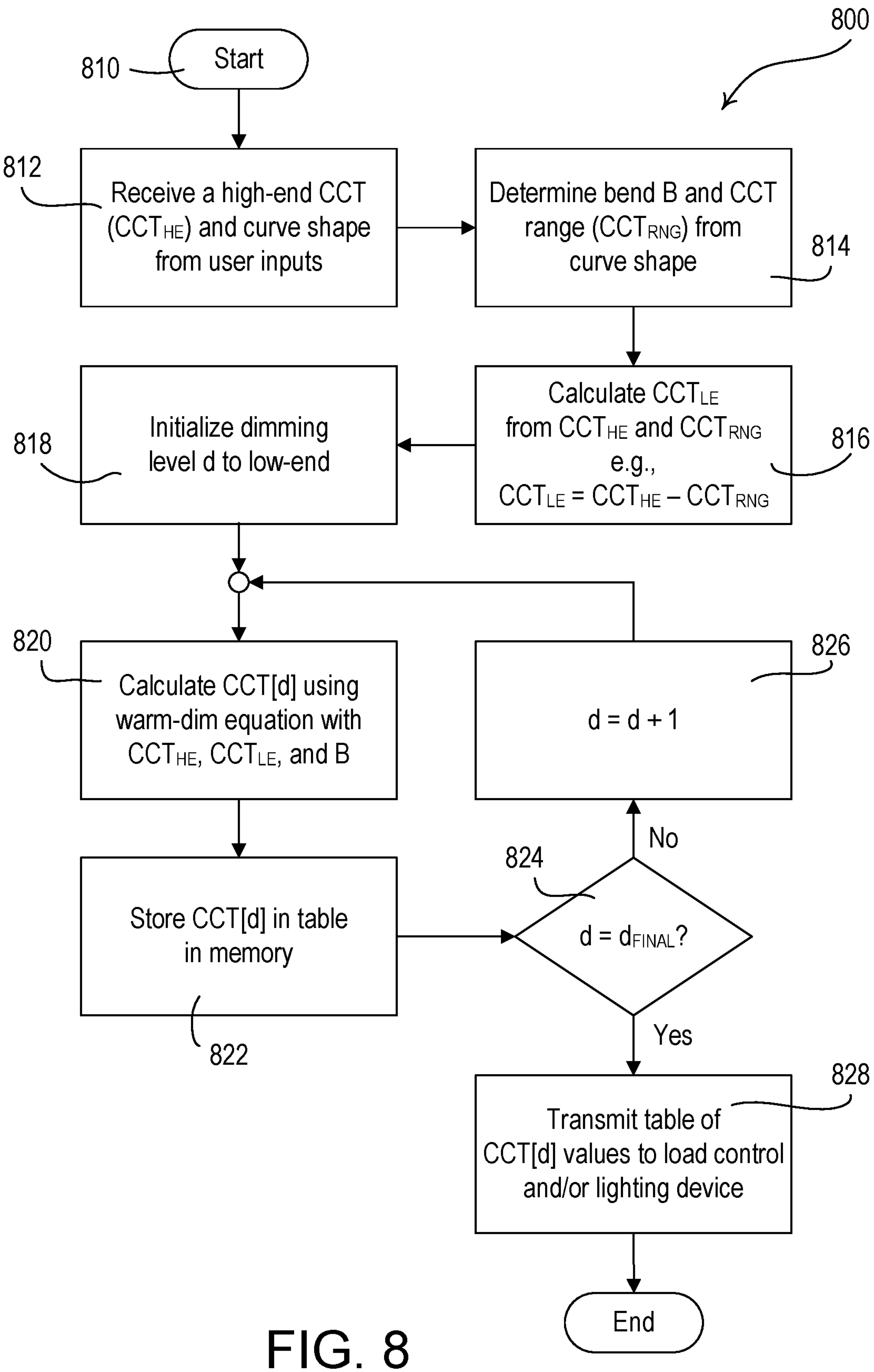
FIG. 8 is a diagram of an example procedure for a device in a lighting control system to generate a customized CCT-dimming curve.

FIG. 8 is a diagram of an example procedure 800 for a device in a lighting control system (e.g., the lighting control system 100) to allow a user to generate a customized CCT-dimming curve. The procedure 800 may be performed by a control circuit (e.g., the control circuit 431) of one or more devices of a lighting control system, such as a mobile device (e.g., a computing device, such as the computing device 160 and/or the device 430 of FIG. 4), a system controller (e.g., the system controller 160), etc. The control circuit may perform the procedure 800 in response to receiving one or more user inputs. The control circuit may receive the user inputs via a user interface of the device. The procedure 800 may, for example, be implemented on a mobile device, and the mobile device may be configured to receive user inputs via the user interface of the mobile device that correspond to the selection of a customized CCT-dimming curve. After the mobile device generates the customized CCT-dimming curve, the mobile device may transmit data relating to the customized CCT-dimming curve to a load control device and/or a lighting device, which may implement the customized CCT-dimming curve.

The procedure 800 may begin at 810, for example, in response to the reception of a user input via the user interface that corresponds to the selection of a customized CCT-dimming curve selection. At 812, the control circuit may receive a high-end CCT value $CCT_{HE}$ and a selection of a predefined curve shape via one or more user inputs (e.g., via the user interface of the mobile device). The high-end CCT value $CCT_{HE}$ may be the color temperature of the emitted light of one or more lighting loads when the target intensity level $L_{TRGT}$ is set to a high-end intensity level $L_{HE}$ (e.g., a maximum intensity, such as approximately 100%). The control circuit may comprise a plurality of preconfigured CCT-dimming curves for selection (e.g., the dimming curves 510, 520, 530, 540 of FIG. 5).

At 814, the control circuit may determine a bend value B and a CCT range $CCT_{RNG}$ based on the selected curve shape (e.g., from memory of the mobile device). As described herein, the control circuit may be configured with a plurality of preconfigured curve shapes (e.g., curve shapes corresponding to the CCT-dimming curves 510, 520, 530, 540 of FIG. 5), where each curve shape may be associated with (e.g., defined by) a CCT range $CCT_{RNG}$ and a bend value B. The CCT range $CCT_{RNG}$ may define the number of CCT values that the CCT-dimming curve corresponding to the curve shape may span across a dimming range (e.g., between a high-end intensity level $L_{HE}$ and a low-end intensity level $L_{LE}$). The bend value B may define the amount of curvature in the line defining the CCT values of the resulting CCT-dimming curve across the dimming range. In some examples, the bend may be a decimal value (e.g., a decimal value between 0-1.0).

At 816, the control circuit may determine (e.g., calculate) a low-end CCT value $CCT_{LE}$ based on the high-end CCT value $CCT_{HE}$ selected by the user and the CCT range $CCT_{RNG}$ of the selected curve shape (e.g., $CCT_{LE}=CCT_{HE}-CCT_{RNG}$ for a warm or daylight dimming curve, or $CCT_{LE}=CCT_{HE}+CCT_{RNG}$ for a cool dimming curve). The low-end CCT value $CCT_{LE}$ may be the color temperature of the emitted light of one or more lighting loads when the target intensity level $L_{TRGT}$ is set to a low-end intensity level $L_{LE}$ (e.g., a minimum intensity level, such as an intensity level of approximately 0.1%-10.0%).

At 818, the control circuit may initialize a dimming level d to an initial value (e.g., a low-end value corresponding to the low-end intensity level $L_{LE}$ or a high-end value corresponding to the high-end intensity level $L_{HE}$). For example, the control circuit may define a plurality of dimming levels across the dimming range, such as 256 values (0-255), although ranges with more or less dimming levels may be used. For instance, the control circuit may initialize the dimming level d to the low-end value (e.g., zero), and may determine the CCT value used when the present intensity $L_{PRES}$ of the lighting load is set to the low-end intensity level $L_{LE}$ (e.g., set the CCT value to be equal to the low-end CCT value $CCT_{LE}$ determined at 816).

The control circuit may calculate a CCT value for a (e.g., each) dimming level across the dimming range (e.g., from the low-end value to the high-end value). For example, at 820, the control circuit may determine (e.g., calculate) a CCT value for the dimming level d based on the high-end CCT value $CCT_{HE}$, the low-end CCT value $CCT_{LE}$, and the bend value B of the selected dimming curve. For example, the control circuit may determine the CCT value for a particular dimming level d based on the following:

$$CCT[d] = \frac{(CCT_{HE} - CCT_{LE}) \cdot (1 + B) \cdot d}{B + d} + CCT_{LE}, \qquad \text{(Equation 1)}$$

where CCT[d] is the CCT value for the dimming level d, $CCT_{HE}$ is the high-end CCT value (e.g., from 812), $CCT_{LE}$ is the low-end CCT value (e.g., from 816), B is the bend value of the selected dimming curve (e.g., from 814), and d is the dimming level (e.g., from 818).

At 822, the control circuit may store the CCT value for the dimming level d in memory. At 824, the control circuit may determine whether the dimming level d is equal to a final dimming level of $d_{FINAL}$ (e.g., the high-end value, such as a dimming level of 255). If the dimming level d does not equal the final dimming level $d_{FINAL}$ at 824, the control circuit may increase the dimming level d by one, and return to 820. For instance, in some examples the system may define a plurality of dimming levels across the dimming range, such as 256 values (0-255). In such examples, the control circuit may associate the low-end CCT value $CCT_{LE}$ with the dimming level d of 0 and associate the high-end CCT value $CCT_{HE}$ with the dimming level d of 255. The control circuit may, in such examples, set the dimming level d to be equal to 1 the first time the control circuit enters 820. The control circuit may be configured to increase the dimming level from 1 to 254 using 820-826 to determine (e.g., calculate) a CCT value for each dimming level d from 1-254. Alternatively, in some examples, the procedure 800 may initialize the dimming level to high-end at 818 and may subtract 1 from the dimming level d at 826 until the dimming level equals the low-end dimming level at 824.

If the control circuit determines that the dimming level d is equal to the final dimming value $d_{FINAL}$ at 824, the control circuit may transmit the CCT values at the various dimming levels across the dimming range to one or more load control devices and/or lighting loads in the lighting control system. In some instance, the control circuit may transmit a table that includes a mapping of the CCT values to dimming levels across the entire dimming range to one or more load control devices and/or lighting device. For example, the control circuit may determine (e.g., calculate) a CCT value (e.g., a different CCT value) for each dimming level across the dimming range, where for example, the low-end CCT value $CCT_{LE}$ is associated with the minimum dimming level (e.g., the low-end value corresponding to the low-end intensity level $L_{LE}$) and the high-end CCT value $CCT_{HE}$ is associated with the final dimming level $d_{FINAL}$ (e.g., the high-end value corresponding to the high-end intensity level $L_{HE}$). As such, the control circuit may be configured to generate a customized CCT-dimming curve using the procedure 800.

After the load control devices and/or lighting loads receive the CCT values at the various dimming levels across the dimming range, the load control devices and/or lighting loads may be configured to control a present intensity level $L_{PRES}$ of the light emitted by the lighting device towards a target intensity level $L_{TRGT}$, and adjust a present color temperature $T_{PRES}$ of the cumulative light emitted by the lighting device towards a target color temperature $T_{TRGT}$, where the target color temperature $T_{TRGT}$ is based on the CCT value of the dimming level d of the present intensity level $L_{PRES}$. Accordingly, the load control devices and/or lighting loads may be configured to control the target color temperature $T_{TRGT}$ as a function of the target intensity level $L_{TRGT}$ using the customized CCT-dimming curve generated using the procedure 800.

In some examples, a device of the lighting control system (e.g., a mobile device, such as the computing device 160) may be configured to transmit limited information relating to the customized CCT-dimming curve to the load control device and/or lighting load. For instance, the device may be configured to transmit the high-end CCT value $CCT_{HE}$, the bend value B, and the CCT range $CCT_{RNG}$ to the lighting device, and the lighting device may calculate the customized CCT-dimming curve. The transmission of a limited amount of information may not only save in transmission overhead, but may also allow the customized CCT-dimming curve to be updated more easily and/or more routinely (e.g., periodically throughout the day based on the time of the day and/or the day of the year). For instance, the CCT-dimming curve may be adjusted based on a user selected scene (e.g., different CCT-dimming curves may be associated with different scenes). For example, an entertaining scene may be associated with a warm CCT-dimming curve with lower CCT values near the low-end intensity $L_{LE}$ (e.g., the dimming curve 510), a reading scene might be associated with a warm CCT-dimming curve with higher CCT values near the low-end intensity $L_{LE}$ (e.g., the dimming curve 530), and an energize scene may be associated with a cool dimming curve (e.g., the dimming curve 540).

Figure 9A:
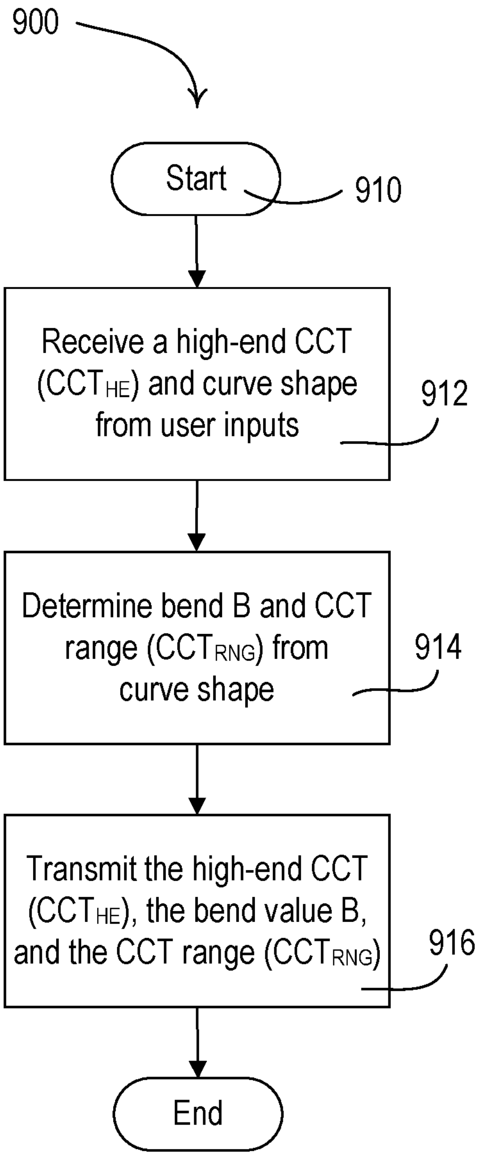
FIG. 9A is a diagram of an example procedure for a device in a lighting control system to generate and transmit one or more values of a customized CCT-dimming curve.

FIG. 9A is a diagram of an example procedure 900 for a device in a lighting control system (e.g., the lighting control system 100) to allow a user to generate a customized CCT-dimming curve. The procedure 900 may be performed by a control circuit (e.g., the control circuit 431) of one or more devices of a lighting control system that provide an interface for a user to generate the customized CCT-dimming curve, such as a mobile device (e.g., a computing device, such as the computing device 160 and/or the device 430 of FIG. 4), a system controller (e.g., the system controller 160), etc. The control circuit may perform the procedure 900 in response to receiving one or more user inputs. The procedure 900 may be implemented, for example, on a mobile device, and the mobile device may be configured to receive user inputs via a user interface of the mobile device that correspond to the selection of a customized CCT-dimming curve. After the mobile device generates the customized CCT-dimming curve, the mobile device may transmit data relating to the customized CCT-dimming curve to a load control device and/or a lighting device, which may implement the customized CCT-dimming curve.

The procedure 900 may begin at 910, for example, in response to the reception of a user input via the user interface that corresponds to the selection of a customized CCT-dimming curve selection. At 912, the control circuit may receive a high-end CCT value $CCT_{HE}$ and a selection of a predefined curve shape via one or more user inputs (e.g., via the user interface of the mobile device). The high-end CCT value $CCT_{HE}$ may be the color temperature of the emitted light of one or more lighting loads when the target intensity level $L_{TRGT}$ is set to a high-end intensity level $L_{HE}$ (e.g., a maximum intensity, such as approximately 100%). Although described in context of the control circuit receiving the high-end CCT value $CCT_{HE}$ at 912, in some examples, the control circuit may receive the low-end CCT value $CCT_{LE}$ at 912 (e.g., and the control circuit in the procedure 920 may then calculate the high-end CCT value $CCT_{HE}$ at 934).

At 914, the control circuit may determine a bend value B and a CCT range $CCT_{RNG}$ based on the selected curve shape (e.g., retrieve from memory of the mobile device). As described herein, the control circuit may be configured with a plurality of preconfigured curve shapes (e.g., curve shapes corresponding to the dimming curves 510, 520, 530, 540 of FIG. 5), where each curve shape may be associated with (e.g., defined by) a CCT range $CCT_{RNG}$ and a bend value B. The CCT range $CCT_{RNG}$ may define the number of CCT values that the CCT-dimming curve corresponding to the curve shape may span across a dimming range (e.g., between a high-end intensity level $L_{HE}$ and a low-end intensity level $L_{LE}$). The bend value B may define the amount of curvature in the line defining the CCT values of the resulting CCT-dimming curve across the dimming range. In some examples, the bend may be a decimal value (e.g., a decimal value between 0-1.0).

At 916, the control circuit may transmit the high-end CCT value $CCT_{HE}$, the bend value B of the selected curve shape, and the CCT range $CCT_{RNG}$ to one or more load control devices and/or lighting devices of the lighting control system. As such, using the procedure 900, the control circuit (e.g., of a mobile device) may be configured to transmit a limited number of values that define a customized CCT-dimming curve to a lighting device (e.g., as opposed to transmitting a complete mapping table of CCT values for every dimming level), such as the high-end CCT value $CCT_{HE}$, the bend value B of the selected curve shape, and the CCT range $CCT_{RNG}$, and the lighting device may be configured to generate a complete mapping and/or table of CCT values for each dimming level across the dimming range (e.g., using the Equation 1).

Although described as transmitting the high-end CCT value $CCT_{HE}$, the bend value B, and the CCT range $CCT_{RNG}$, the control circuit may determine and/or transmit any combination of custom CCT-dimming curve data to the load control device(s) and/or lighting device(s) of the lighting control system. For example, the custom CCT-dimming curve data may include any combination of the high-end CCT value $CCT_{HE}$, the low-end CCT value $CCT_{LE}$, one or more intermediate CCT values $CCT_{INT}$, the bend value B, and/or the CCT range $CCT_{RNG}$. For example, the control circuit may determine and transmit the high-end CCT value $CCT_{HE}$, the low-end CCT value $CCT_{LE}$, and the bend value B. Alternatively or additionally, the control circuit may determine and transmit a plurality of CCT values and associated dimming levels, such as the high-end CCT value $CCT_{HE}$, the low-end CCT value $CCT_{LE}$, and one or more intermediate CCT values $CCT_{INT}$ (e.g., as described with reference to the procedure 700).

Figure 9B:
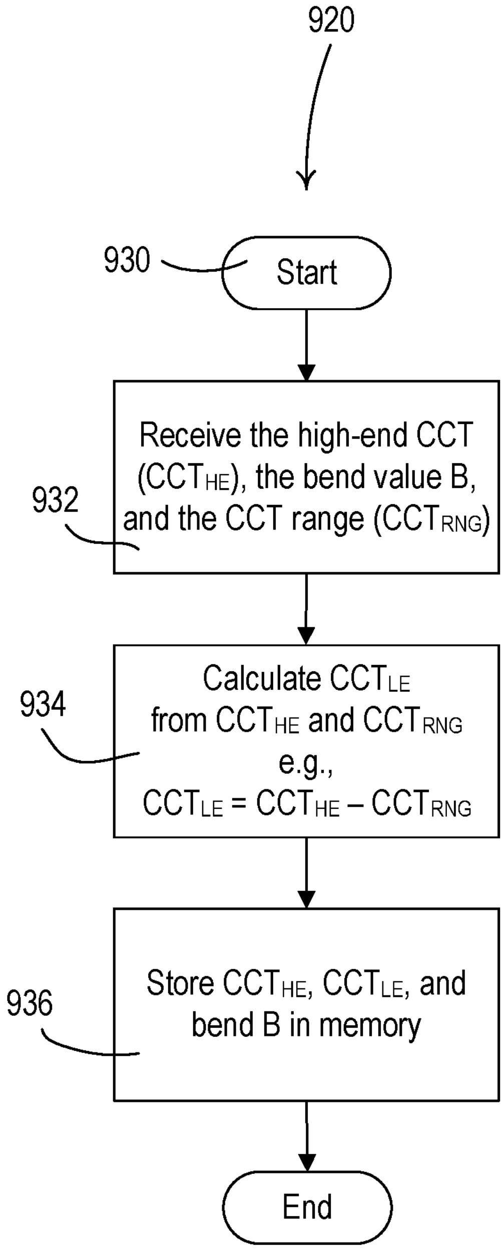
FIG. 9B is a diagram of an example procedure for a device in a lighting control system to generate a customized CCT-dimming curve based on received data.

FIG. 9B is a diagram of an example procedure 920 for a device in a lighting control system (e.g., the lighting control system 100) to generate a customized CCT-dimming curve based on received data. The procedure 920 may be performed by a control circuit (e.g., the control circuit 340) of one or more devices of a lighting control system that will implement the customized CCT-dimming curve, such as a load control device (e.g., a dimmer, such as the dimmer 140, an LED driver, such as the LED driver 130, etc.) or a lighting device (e.g., a smart bulb, such as the smart bulb 120*a*, 120*b*, the controllable lighting device 300, etc.). The control circuit may perform the procedure 920 in response to receiving data relating to a customized CCT-dimming curve. The procedure 920 may, for example, be implemented on a lighting device, and the lighting device may be configured to store data that defines a customized CCT-dimming curve for use when controlling the emitted light of one or more lighting loads.

The procedure 920 may begin at 930, for example, in response to the reception of data, such data relating to a customized CCT-dimming curve, from another device of the lighting control system (e.g., such as a mobile device performing the procedure 900). At 932, the control circuit may receive a high-end CCT value $CCT_{HE}$, a bend value B, and a CCT range $CCT_{RNG}$ from another device of the lighting control system. As described herein, the high-end CCT value $CCT_{HE}$ may be the color temperature of the emitted light of one or more lighting loads when the target intensity level $L_{TRGT}$ is set to a high-end intensity level $L_{HE}$ (e.g., a maximum intensity, such as approximately 100%). Further, the CCT range $CCT_{RNG}$ may define a range of CCT values across a dimming range (e.g., between a high-end intensity level $L_{HE}$ and a low-end intensity level $L_{LE}$), while the bend value B may define amount of curvature in the line defining the CCT values across the dimming range. In some examples, the bend may be a decimal value (e.g., a decimal value between 0-1.0).

At 934, the control circuit may determine (e.g., calculate) a low-end CCT value $CCT_{LE}$. For example, the control circuit may calculate the low-end CCT value $CCT_{LE}$ based on the high-end CCT value $CCT_{HE}$ and the CCT range $CCT_{RNG}$ (e.g., $CCT_{LE}=CCT_{HE}-CCT_{RNG}$ for a warm or daylight dimming curve, or $CCT_{LE}=CCT_{HE}+CCT_{RNG}$ for a cool dimming curve). The low-end CCT value $CCT_{LE}$ may be the color temperature of the emitted light of one or more lighting loads when the target intensity level $L_{TRGT}$ is set to a low-end intensity level $L_{LE}$ (e.g., a minimum intensity level, such as approximately 0.1%-10.0%).

At 936, the control circuit may store the high-end CCT value $CCT_{HE}$, the low-end CCT value $CCT_{LE}$, and the bend value B in memory the device. Accordingly, using the procedure 900, the control circuit may be configured to receive values relating to a customized CCT-dimming curve, store these values, and control the emitted lighting of a lighting load based on these values (e.g., and the target intensity level $L_{TRGT}$ of the lighting load). For instance, the control circuit may store a minimal amount of data, such as the high-end CCT value $CCT_{HE}$, the low-end CCT value $CCT_{LE}$, and the bend value B in memory, and be configured to control the emitted light of a lighting device in accordance with the customized CCT-dimming curve (e.g., using the Equation 1). In some examples, the control circuit may be configured to determine the CCT value for a present dimming level d (e.g., target intensity level $L_{TRGT}$) based on the high-end CCT value $CCT_{HE}$, the low-end CCT value $CCT_{LE}$, and the bend value B, for example, without having to store in memory a complete mapping and/or table of CCT values for each dimming level across the dimming range. Alternatively or additionally, the control circuit may be able to generate a complete mapping and/or table of CCT values for each dimming level across the dimming range based on the high-end CCT value $CCT_{HE}$, the low-end CCT value $CCT_{LE}$, and the bend value B (e.g., using the procedure 800, such as 818 through 828 of the procedure 800).

Figure 9C:
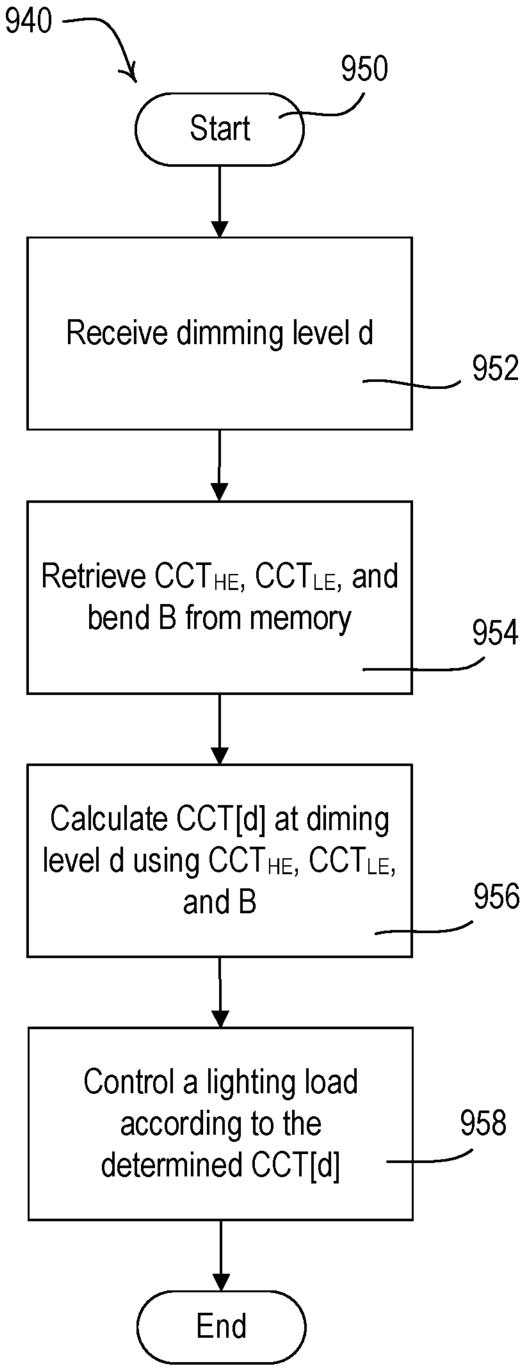
FIG. 9C is a diagram of an example procedure for a device in a lighting control system to use one or more values associated with a customized CCT-dimming curve stored in memory to control the emitted light of a lighting load.

FIG. 9C is a diagram of an example procedure 940 for a device in a lighting control system (e.g., the lighting control system 100) to use one or more values associated with a customized CCT-dimming curve stored in memory to control the emitted light of a lighting load. The procedure 940 may be performed by a control circuit (e.g., the control circuit 340) of one or more devices of a lighting control system that will implement the customized CCT-dimming curve, such as a load control device (e.g., a dimmer, such as the dimmer 140, an LED driver, such as the LED driver 130, etc.) or a lighting device (e.g., a smart bulb, such as the smart bulb 120*a*, 120*b*, the controllable lighting device 300, etc.). The control circuit may perform the procedure 940 in response to receiving an input (e.g., a command) to change a target or present intensity level of one or more lighting loads.

The procedure 940 may begin at 950, for example, in response to the reception of an input for adjusting the present intensity level of one or more lighting load. At 952, the control circuit may determine and/or receive a dimming level d for one or more lighting loads. For example, the control circuit may receive the dimming level d in a command and/or control message from another device of the lighting control system (e.g., a mobile device, such as the computing device 160, a system controller, such as the system controller 150, a dimmer, such as the dimmer 140, an LED driver, such as the LED driver 130, etc.). The control circuit may determine to control an amount of power delivered to its lighting load in accordance with control message (e.g., wireless control message).

At 954, the control circuit may retrieve a high-end CCT value $CCT_{HE}$, a low-end CCT value $CCT_{LE}$, and a bend value B from memory of the device (e.g., the high-end CCT value $CCT_{HE}$, the low-end CCT value $CCT_{LE}$, and the bend value B the device stored in memory during 936 of the procedure 920).

At 956, the control circuit may determine (e.g., calculate) a CCT value for the dimming level d received at 952 based on the high-end CCT value $CCT_{HE}$, the low-end CCT value $CCT_{LE}$, and the bend value B that was retrieved from memory at 954. For example, the control circuit may determine the CCT value for the dimming level d based on the following:

$$CCT[d] = \frac{(CCT_{HE} - CCT_{LE}) \cdot (1 + B) \cdot d}{B + d} + CCT_{LE}, \quad \text{(Equation 1)}$$

where CCT[d] is the CCT value for the dimming level d, $CCT_{HE}$ is the high-end CCT value, $CCT_{LE}$ is the low-end CCT value, B is the bend value of the selected dimming curve, and d is the dimming level.

At 958, the control circuit may control a lighting load (e.g., the emitter control circuit 336) according to the dimming level d and the CCT value determined at 956. For example, the control circuit may be configured to control a present intensity level $L_{PRES}$ of the light emitted by the lighting device towards a target intensity level $L_{TRGT}$ that is based on the dimming level d, and adjust a present color temperature $T_{PRES}$ of the cumulative light emitted by the lighting device towards a target color temperature $T_{TRGT}$ that is based on the CCT[d] value, which is based on the dimming level d. Accordingly, the control circuit may be configured to control the target color temperature $T_{TRGT}$ as a function of the target intensity level $L_{TRGT}$ using the customized CCT-dimming curve that is defined by the stored values of the high-end CCT value $CCT_{HE}$, the low-end CCT value $CCT_{LE}$, and the bend value B (e.g., that themselves where generated, communicated, and stored using the procedures 900 and 920).

Figure 9D:
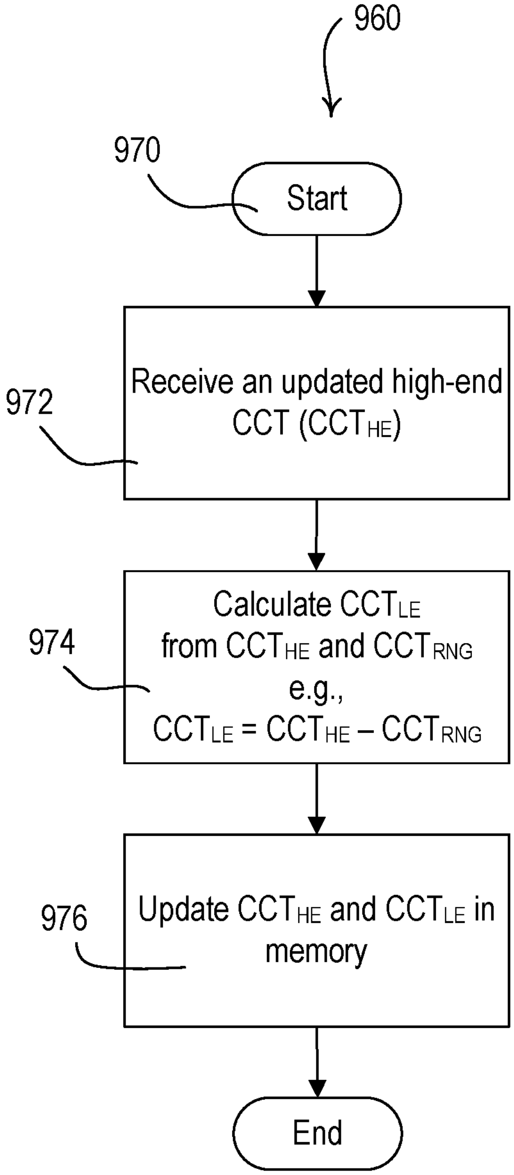
FIG. 9D is a diagram of an example procedure for a device in a lighting control system to update characteristics of a dimming curve that is to control the emitted light of a lighting load.

FIG. 9D is a diagram of an example procedure 960 for a device in a lighting control system (e.g., the lighting control system 100) to update characteristics of a CCT-dimming curve that is to control the emitted light of a lighting load. The procedure 960 may be performed by a control circuit (e.g., the control circuit 340) of one or more devices of a lighting control system that will implement the customized CCT-dimming curve, such as a load control device (e.g., a dimmer, such as the dimmer 140, an LED driver, such as the LED driver 130, etc.), a lighting device (e.g., a smart bulb, such as the smart bulb 120*a*, 120*b*, the controllable lighting device 300, etc.), a system controller (e.g., the system controller 160), etc. The control circuit may perform the procedure 960 in response to receiving an input to change a characteristic of the dimming curve (e.g., the high-end CCT value $CCT_{HE}$).

The procedure 960 may begin at 970, for example, in response to the reception of a change to a characteristic of the dimming curve. At 972, the control circuit may receive an updated high-end CCT value $CCT_{HE}$. The control circuit may receive the updated high-end CCT value $CCT_{HE}$ based on a user input, the time of day, a timeclock configuration (e.g., natural show control technique), or other parameter (e.g., offset value). In some examples, the control circuit may be configured to operate one or more lighting loads in accordance with a natural show control technique. When operating according to natural show control technique, the control circuit may be configured to adjust the CCT value (e.g., the high-end CCT value $CCT_{HE}$) of the emitted light throughout the day. The control circuit may determine the CCT value periodically based on the time of day, or may receive the CCT value periodically from a system control. For instance, the control circuit may adjust the high-end CCT value $CCT_{HE}$ throughout the day to more closely conform to the color temperature (CCT value) of a black body radiator (e.g., the sun) based on the time of day (e.g., according to the circadian rhythm of the sun). For example, the high-end CCT value $CCT_{HE}$ may be lower in the morning, increase towards a higher value around noon, and then decrease until the sun sets in the evening. In such examples, the control circuit may be configured with a timeclock schedule that is used to determine the updated high-end CCT values $CCT_{HE}$ based on the time of day. Further, if the user were to adjust the target intensity level $L_{TRGT}$ of the lighting load while operating in a natural show control technique, the control circuit may determine the CCT value for the dimming level d of the target intensity level $L_{TRGT}$ received via the user input. In such examples, the control circuit may retrieve the updated high-end CCT value $CCT_{HE}$ from memory based on the time of day at 972.

At 974, the control circuit may determine (e.g., calculate) an updated low-end CCT value $CCT_{LE}$ based on the updated high-end CCT value $CCT_{HE}$ received at 972. For example, the control circuit may calculate the updated low-end CCT value $CCT_{LE}$ based on the updated high-end CCT value $CCT_{HE}$ and the CCT range $CCT_{RNG}$ (e.g., $CCT_{LE}=CCT_{HE}-CCT_{RNG}$ for a warm or daylight dimming curve, or $CCT_{LE}=CCT_{HE}+CCT_{RNG}$ for a cool dimming curve).

At 976, the control circuit may store the updated high-end CCT value $CCT_{HE}$ and updated low-end CCT value $CCT_{LE}$ in memory of the device, for example, and maintain the same bend value B and CCT range $CCT_{RNG}$. Accordingly, the lighting device and/or lighting load may be configured with a customized CCT-dimming curve, and in addition, may also be configured to adjust the intensity level of the lighting while operating according to a natural show control technique (e.g., where the high-end and low-end CCT values of the customized CCT-dimming curve may be adjusted based on the time of day). Therefore, the lighting device and/or lighting load may be configured with a customized CCT-dimming curve and a natural show control technique.

What is claimed is:

1. A method for creating a correlated color temperature dimming (CCT-dimming) curve for a lighting load using at least one processor, the method comprising:

determining, via the at least one processor, CCT-dimming curve data, wherein the CCT-dimming curve data comprises any combination of a high-end CCT value, a low-end CCT value, a CCT range, and a bend value; and transmitting, via a transmitter, the CCT-dimming curve data to a lighting device;

storing the CCT-dimming curve data in a memory of the lighting device;

receiving, via a receiver, a command to adjust an intensity level of the lighting load to a commanded intensity level; and controlling, via the at least one processor, a CCT value of the lighting load based on the CCT-dimming curve data and the commanded intensity level; and wherein the high-end CCT value is associated with a high-end intensity level of the lighting load, the low-end CCT value is associated with a low-end intensity level of the lighting load, the CCT range defines a difference between the high-end CCT value and the low-end CCT value, and the bend value defines an amount of curvature in a line defining the CCT values across a dimming range between the high-end CCT value and the low-end CCT value.

2. The method of claim 1, further comprising:

generating, via the at least one processor, a CCT-dimming curve using the CCT-dimming curve data.

3. The method of claim 1, wherein the CCT-dimming curve data comprises the high-end CCT value, the low-end CCT value, and the bend.

4. The method of claim 1, wherein the CCT-dimming curve data comprises the high-end CCT value, the CCT range, and the bend value.

5. The method of claim 1, wherein the CCT-dimming curve data comprises the low-end CCT value, the CCT range, and the bend.

6. The method of claim 1, further comprising:

retrieving, via the at least one processor, the high-end CCT value, the low-end CCT value, and the bend value from the memory; and determining, via the at least one processor, the CCT value for the commanded intensity level based on the high-end CCT value, the low-end CCT value, and the bend value.

7. The method of claim 6, wherein the CCT value for the commanded intensity level is determined based on:

$$CCT[d] = \frac{(CCT_{HE} - CCT_{LE}) \cdot (1 + B) \cdot d}{B + d} + CCT_{LE},$$

where CCT[d] is the CCT value for the commanded intensity level, $CCT_{HE}$ is the high-end CCT value, $CCT_{LE}$ is the low-end CCT value, B is the bend value, and d is the commanded intensity level.

8. The method of claim 7, further comprising:

receiving an updated high-end CCT value;

calculating, via the at least one processor, an updated low-end CCT value based on the updated high-end CCT value and the CCT range; and storing the updated high-end CCT value and the updated low-end CCT value in the memory.

9. The method of claim 1, further comprising:

receiving, via a user selection, a curve shape from a plurality of selectable curve shapes; and determining, via the at least one processor, the bend value and the CCT range based on the selected curve shape.

10. The method of claim 9, wherein the plurality of selectable curve shapes comprises a warm CCT-dimming curve shape, a daylight CCT-dimming curve shape, and a cool CCT dimming curve shape.

11. The method of claim 9, further comprising:

receiving, via a user selection, the high-end CCT value, wherein the high-end CCT value is associated with a high-end intensity level of the lighting load, wherein the CCT-dimming curve data comprises the high-end CCT value, the CCT range, and the bend value.

12. The method of claim 11, further comprising:

determining, via the at least one processor, the low-end CCT value based on the high-end CCT value and the range; and storing the high-end CCT value, the low-end CCT value and the bend value in the memory of the lighting device.

13. The method of claim 9, further comprising:

display, via a display of a mobile device, a plurality of selectable curve shapes; and transmitting, via the transmitter, the selected curve shape to a control device.

14. The method of claim 1, further comprising:

displaying, via a display of a mobile device, a graphical user interface (GUI) for allowing a user to select the high-end CCT value of the light emitted by the lighting load while a present intensity level of the lighting load is at a high-end intensity level;

transmitting, via a transmitter of the mobile device, a control signal to the lighting device that indicates the high-end CCT value selected by the user;

adjusting the present intensity level of the lighting load to the high-end intensity level; and adjusting the CCT of the light emitted by the lighting load while the present intensity level of the lighting load is at the high-end intensity level to the high-end CCT value selected by the user.

15. A system for creating a correlated color temperature dimming (CCT-dimming) curve for a lighting load, the system comprising:

a lighting device comprising a lighting load, a memory, a receiver, and a processor; and a control device comprising a processor and a transmitter, the processor configured to:

determine CCT-dimming curve data, wherein the CCT-dimming curve data comprises any combination of a high-end correlated color temperature (CCT) value, a low-end CCT value, a CCT range, and a bend value; and transmit the CCT-dimming curve data to the lighting device;

wherein the processor of the lighting device is configured to:

store the CCT-dimming curve data in the memory of the lighting device;

receive a command to adjust an intensity level of the lighting load to a commanded intensity level; and control a CCT value of the lighting load based on the CCT-dimming curve data and the commanded intensity level; and wherein the high-end CCT value is associated with a high-end intensity level of the lighting load, the low-end CCT value is associated with a low-end intensity level of the lighting load, the CCT range defines a difference between the high-end CCT value and the low-end CCT value, and the bend value defines an amount of curvature in a line defining the CCT values across a dimming range between the high-end CCT value and the low-end CCT value.

16. The system of claim 15, wherein the processor of the lighting device is configured to:

generate a CCT-dimming curve using the CCT-dimming curve data received from the control device.

17. The system of claim 15, wherein the processor of the lighting device is configured to:

retrieve the high-end CCT value, the low-end CCT value, and the bend value from the memory; and determine the CCT value for the commanded intensity level based on the high-end CCT value, the low-end CCT value, and the bend value.

18. The system of claim 17, wherein the processor of the lighting device is configured to determine the CCT value for the commanded intensity level based on:

$$CCT[d] = \frac{(CCT_{HE} - CCT_{LE}) \cdot (1 + B) \cdot d}{B + d} + CCT_{LE},$$

where CCT[d] is the CCT value for the commanded intensity level, $CCT_{HE}$ is the high-end CCT value, $CCT_{LE}$ is the low-end CCT value, B is the bend value, and d is the commanded intensity level.

19. The system of claim 15, further comprising:

a mobile device comprising a display, a transmitter, and a processor, wherein the processor of the mobile device is configured to:

display a plurality of selectable curve shapes on the display; and transmit the selected curve shape to the control device.

* * * * *